US012275561B2

(12) United States Patent
Pawloski

(10) Patent No.: US 12,275,561 B2
(45) **Date of Patent: *Apr. 15, 2025**

(54) RECLOSABLE BAG HAVING A LOUD SOUND DURING CLOSING

(71) Applicant: S. C. JOHNSON & SON, INC., Racine, WI (US)

(72) Inventor: James C. Pawloski, Bay City, MI (US)

(73) Assignee: S. C. JOHNSON & SON, INC., Racine, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/212,940

(22) Filed: Jun. 22, 2023

(65) Prior Publication Data

US 2023/0331440 A1 Oct. 19, 2023

Related U.S. Application Data

(63) Continuation of application No. 17/505,214, filed on Oct. 19, 2021, now Pat. No. 11,691,789, which is a continuation of application No. 12/950,350, filed on Nov. 19, 2010, now Pat. No. 11,180,286, which is a continuation-in-part of application No. 12/916,026, filed on Oct. 29, 2010, now Pat. No. 9,327,875, said application No. 12/950,350 is a continuation-in-part of application No. 12/916,005, filed on Oct. 29, 2010, now Pat. No. 8,974,118.

(51) Int. Cl.
*B65D 33/25* (2006.01)
*G10K 15/04* (2006.01)

(52) U.S. Cl.
CPC ........... *B65D 33/255* (2013.01); *G10K 15/04* (2013.01); *Y10T 24/2534* (2015.01)

(58) Field of Classification Search
CPC ................ B65D 33/25; B65D 33/2508; B65D 33/2516; B65D 33/2525; B65D 33/2533; B65D 33/2541; B65D 33/255; B65D 33/2558; B65D 33/2566; B65D 33/2575; B65D 33/2583; B65D 33/2584; B65D 33/2585; B65D 33/2586; B65D 33/25865; B65D 33/2587; B65D 33/2588; B65D 33/2589; B65D 33/259
USPC ..................................... 383/61.1, 63, 64, 65
See application file for complete search history.

(56) References Cited

U.S. PATENT DOCUMENTS 2,035,674 A 3/1936 Sipe
2,822,012 A 2/1958 Abraham
3,338,284 A 8/1967 Ausnit
(Continued)

FOREIGN PATENT DOCUMENTS

DE 1226817 B 10/1966
DE 2504863 A1 8/1976
EP 510797 A1 10/1992

*Primary Examiner* — Jes F Pascua
*Assistant Examiner* — Nina K Attel
(74) *Attorney, Agent, or Firm* — Quarles & Brady LLP

(57) ABSTRACT

A zipper for a reclosable bag includes an elongated groove profile having two arms which form a general U-shape to define an opening to a channel, and an elongated rib profile opposing the groove profile. A plurality of first segments of the rib profile alternate with a plurality of second segments of the rib profile to create a structural discontinuity along a length thereof. During interlocking of the groove and rib profiles, an audible clicking sound of at least 50 dB on average is created during opening and closing.

20 Claims, 11 Drawing Sheets

(56) References Cited

U.S. PATENT DOCUMENTS 3,416,585 A 12/1968 Staller
3,808,649 A 5/1974 Ausnit
3,937,395 A 2/1976 Lawes
RE28,969 E 9/1976 Naito
4,186,786 A 2/1980 Kirkpatrick
4,191,076 A 3/1980 Bollmer et al.
4,285,105 A 8/1981 Kirkpatrick
4,372,014 A 2/1983 Simpson
4,419,159 A 12/1983 Herrington
4,428,788 A 1/1984 Kamp
4,479,244 A 10/1984 Ausnit
4,484,352 A 11/1984 Katzin
4,515,647 A 5/1985 Behr
4,522,678 A 6/1985 Zieke
4,532,652 A 7/1985 Herrington
4,555,282 A 11/1985 Yano
4,561,108 A 12/1985 Kamp
4,561,109 A 12/1985 Fox
4,562,027 A 12/1985 Behr et al.
4,578,813 A 3/1986 Ausnit
4,586,319 A 5/1986 Ausnit
4,615,045 A 9/1986 Siegel
4,618,383 A 10/1986 Herrington
4,655,862 A 4/1987 Christoff et al.
4,672,723 A 6/1987 Hugues et al.
4,673,383 A 6/1987 Bentsen
4,676,851 A 6/1987 Scheibner
4,683,015 A 7/1987 Wagers
4,698,118 A 10/1987 Takahashi
4,701,358 A 10/1987 Behr et al.
4,709,399 A 11/1987 Sanders
4,709,400 A 11/1987 Bruno
4,710,968 A 12/1987 Borchardt
4,736,451 A 4/1988 Ausnit
4,736,496 A 4/1988 Fisher et al.
4,741,789 A 5/1988 Zieke et al.
4,755,248 A 7/1988 Geiger
4,764,977 A 8/1988 Wagers
4,787,880 A 11/1988 Ausnit
4,788,282 A 11/1988 Deziel
4,791,710 A 12/1988 Nocek et al.
4,792,240 A 12/1988 Ausnit
4,796,300 A 1/1989 Branson
4,812,056 A 3/1989 Zieke
4,812,192 A 3/1989 Woods et al.
4,822,539 A 4/1989 Tilman
4,829,641 A 5/1989 Williams
4,832,768 A 5/1989 Takahashi
4,834,554 A 5/1989 Stetler, Jr. et al.
4,846,586 A 7/1989 Bruno
4,859,259 A 8/1989 Scheibner
4,869,725 A 9/1989 Schneider et al.
4,898,492 A 2/1990 Janowski
4,906,310 A 3/1990 Broderick et al.
4,907,321 A 3/1990 Williams
4,941,238 A 7/1990 Clark
4,964,739 A 10/1990 Branson et al.
5,009,828 A 4/1991 McCree
5,012,561 A 5/1991 Porchia et al.
5,017,021 A 5/1991 Simonsen
5,022,530 A 6/1991 Zieke
5,023,122 A 6/1991 Boeckmann et al.
5,049,223 A 9/1991 Dais et al.
5,053,091 A 10/1991 Giljam et al.
5,056,933 A 10/1991 Kamp
5,067,822 A 11/1991 Wirth et al.
5,070,584 A 12/1991 Dais et al.
5,092,684 A 3/1992 Weeks
5,138,750 A 8/1992 Gundlach
5,140,727 A 8/1992 Dais et al.
5,141,577 A 8/1992 Porchia et al.
5,154,086 A 10/1992 Porchia
5,167,454 A 12/1992 Woods et al.
5,184,896 A 2/1993 Hammond et al.
5,192,135 A 3/1993 Woods et al.
5,198,055 A 3/1993 Wirth et al.
5,209,574 A 5/1993 Tilman
5,211,481 A 5/1993 Tilman
5,235,731 A 8/1993 Anzai et al.
5,238,306 A 8/1993 Heintz et al.
5,248,201 A 9/1993 Kettner et al.
5,252,281 A 10/1993 Kettner
5,259,904 A 11/1993 Ausnit
5,307,552 A 5/1994 Dais et al.
5,326,176 A 7/1994 Domke
5,345,659 A 9/1994 Allan
5,356,222 A 10/1994 Kettner
5,358,334 A 10/1994 Simonsen
5,366,294 A 11/1994 Wirth et al.
5,368,394 A 11/1994 Scott
5,369,847 A 12/1994 Naya et al.
5,382,094 A 1/1995 Ausnit
5,384,942 A 1/1995 Siegel
5,388,910 A 2/1995 Koyanagi
5,397,182 A 3/1995 Gaible et al.
5,403,094 A 4/1995 Tomic
5,405,561 A 4/1995 Dais
5,415,904 A 5/1995 Takubo et al.
5,462,360 A 10/1995 Tilman et al.
5,478,228 A 12/1995 Dais et al.
5,492,705 A 2/1996 Porchia et al.
5,509,734 A 4/1996 Ausnit
5,511,884 A 4/1996 Bruno et al.
5,525,363 A 6/1996 Herber et al.
5,527,112 A 6/1996 Dais et al.
5,558,493 A 9/1996 Hayashi et al.
5,575,747 A 11/1996 Dais
5,577,305 A 11/1996 Johnson
5,588,187 A 12/1996 Swain
5,611,627 A 3/1997 Belias et al.
5,618,111 A 4/1997 Porchia
5,647,100 A 7/1997 Porchia et al.
5,655,273 A 8/1997 Tomic et al.
5,660,479 A 8/1997 May et al.
5,664,299 A 9/1997 Porchia
5,669,715 A 9/1997 Dobreski
5,672,009 A 9/1997 Malin
5,686,126 A 11/1997 Noel et al.
5,689,866 A 11/1997 Kasai
5,713,669 A 2/1998 Thomas et al.
5,718,024 A 2/1998 Robbins
5,720,557 A 2/1998 Simonsen
5,722,128 A 3/1998 Toney et al.
5,729,876 A 3/1998 Johnson
5,747,126 A 5/1998 Van Erden et al.
5,749,658 A 5/1998 Kettner
5,769,772 A 6/1998 Wiley
5,774,955 A 7/1998 Borchardt et al.
5,775,812 A 7/1998 St. Phillips
5,794,315 A 8/1998 Crabtree
5,804,265 A 9/1998 Saad et al.
5,809,621 A 9/1998 McCree
5,817,380 A 10/1998 Tanaka
5,827,163 A 10/1998 Kettner
5,832,145 A 11/1998 Dais
5,832,570 A 11/1998 Thorpe et al.
5,836,056 A 11/1998 Porchia et al.
5,839,831 A 11/1998 Mazzocchi
D406,685 S 3/1999 McGinnis
5,878,468 A 3/1999 Tomic
5,902,046 A 5/1999 Shibata
5,911,508 A 6/1999 Dobreski et al.
5,927,855 A 7/1999 Tomic et al.
5,930,877 A 8/1999 Thorpe et al.
5,933,927 A 8/1999 Miller et al.
5,934,806 A 8/1999 Tomic
5,950,285 A 9/1999 Porchia
5,953,796 A 9/1999 McMahon et al.
5,955,160 A 9/1999 Tanaka et al.
5,962,040 A 10/1999 Dais et al.
5,964,532 A 10/1999 St. Phillips et al.
5,967,663 A 10/1999 Vaquero
5,988,880 A 11/1999 Tomic
6,009,603 A 1/2000 Gallagher

(56) References Cited

U.S. PATENT DOCUMENTS

| | | | |
|---|---|---|---|
| 6,010,244 | A | 1/2000 | Dobreski et al. |
| 6,014,795 | A | 1/2000 | McMahon et al. |
| 6,021,557 | A | 2/2000 | Dais et al. |
| 6,030,122 | A | 2/2000 | Ramsey et al. |
| 6,032,437 | A | 3/2000 | Bois |
| 6,071,011 | A | 6/2000 | Thomas |
| 6,074,096 | A | 6/2000 | Tilman |
| 6,077,208 | A | 6/2000 | Larkin et al. |
| 6,080,252 | A | 6/2000 | Plourde |
| 6,110,586 | A | 8/2000 | Johnson |
| 6,112,374 | A | 9/2000 | Van Erden |
| 6,135,636 | A | 10/2000 | Randall |
| 6,138,329 | A | 10/2000 | Johnson |
| 6,139,186 | A | 10/2000 | Fraser |
| 6,148,588 | A | 11/2000 | Thomas et al. |
| 6,149,302 | A | 11/2000 | Taheri |
| 6,152,600 | A | 11/2000 | Tomic |
| 6,156,363 | A | 12/2000 | Chen et al. |
| 6,164,825 | A | 12/2000 | Larkin et al. |
| 6,167,597 | B1 | 1/2001 | Malin |
| 6,170,696 | B1 | 1/2001 | Tucker et al. |
| 6,170,985 | B1 | 1/2001 | Shabram, Jr. et al. |
| 6,187,396 | B1 | 2/2001 | Moller |
| 6,210,038 | B1 | 4/2001 | Tomic |
| 6,217,215 | B1 | 4/2001 | Tomic |
| 6,217,216 | B1 | 4/2001 | Taheri |
| 6,220,754 | B1 | 4/2001 | Stiglic |
| 6,221,484 | B1 | 4/2001 | Leiter |
| 6,228,484 | B1 | 5/2001 | Willert-Porada et al. |
| 6,228,485 | B1 | 5/2001 | Leiter |
| 6,231,236 | B1 | 5/2001 | Tilman |
| 6,257,763 | B1 | 7/2001 | Stolmeier et al. |
| 6,279,298 | B1 | 8/2001 | Thomas et al. |
| 6,286,681 | B1 | 9/2001 | Wilfong, Jr. |
| 6,286,999 | B1 | 9/2001 | Cappel |
| 6,293,701 | B1 | 9/2001 | Tomic |
| 6,318,894 | B1 | 11/2001 | Derenthal |
| 6,321,423 | B1 | 11/2001 | Johnson |
| 6,360,513 | B1 | 3/2002 | Strand et al. |
| 6,371,643 | B2 | 4/2002 | Saad et al. |
| 6,386,762 | B1 | 5/2002 | Randall |
| 6,398,411 | B2 | 6/2002 | Metzger |
| 6,443,617 | B2 | 9/2002 | Tetenborg |
| 6,461,042 | B1 | 10/2002 | Tomic |
| 6,461,043 | B1 | 10/2002 | Healy et al. |
| 6,481,890 | B1 | 11/2002 | VandenHeuvel |
| 6,487,758 | B2 | 12/2002 | Shaffer |
| 6,491,433 | B2 | 12/2002 | Shabram, Jr. et al. |
| 6,539,594 | B1 | 4/2003 | Kasai et al. |
| 6,550,966 | B1 | 4/2003 | Saad |
| 6,553,740 | B2 | 4/2003 | Delisle |
| 6,571,430 | B1 | 6/2003 | Savicki et al. |
| 6,574,939 | B1 | 6/2003 | Heijnen |
| 6,581,249 | B1 | 6/2003 | Savicki et al. |
| 6,582,122 | B2 | 6/2003 | Shimizu |
| 6,592,260 | B1 | 7/2003 | Randall et al. |
| 6,594,872 | B2 | 7/2003 | Cisek |
| 6,637,937 | B2 | 10/2003 | Bois |
| 6,637,939 | B2 | 10/2003 | Huffer |
| 6,686,005 | B2 | 2/2004 | White et al. |
| 6,691,383 | B2 | 2/2004 | Linton |
| 6,692,147 | B2 | 2/2004 | Nelson |
| 6,703,046 | B2 | 3/2004 | Fitzhugh |
| 6,712,509 | B2 | 3/2004 | Cappel |
| 6,786,712 | B2 | 9/2004 | Cisek |
| 6,789,946 | B2 | 9/2004 | Plourde |
| 6,854,886 | B2 | 2/2005 | Piechocki et al. |
| 6,877,898 | B2 | 4/2005 | Berich et al. |
| 6,953,542 | B2 | 10/2005 | Cisek |
| 6,954,969 | B1 | 10/2005 | Sprehe |
| 6,962,439 | B2 | 11/2005 | Taheri |
| 7,017,240 | B2 | 3/2006 | Savicki |
| 7,036,988 | B2 | 5/2006 | Olechowski |
| 7,137,736 | B2 | 11/2006 | Pawloski et al. |
| RE39,505 | E | 3/2007 | Thomas et al. |
| 7,234,865 | B2 | 6/2007 | Piechocki |
| 7,241,046 | B2 | 7/2007 | Piechocki et al. |
| 7,305,742 | B2 | 12/2007 | Anderson |
| 7,334,682 | B2 | 2/2008 | Goepfert |
| 7,347,624 | B2 | 3/2008 | Savicki |
| RE40,284 | E | 5/2008 | Thomas |
| 7,410,298 | B2 | 8/2008 | Pawloski |
| 7,517,484 | B2 | 4/2009 | Wu |
| 7,534,039 | B2 | 5/2009 | Wu |
| 7,543,361 | B2 | 6/2009 | Borchardt et al. |
| 7,651,271 | B2 | 1/2010 | Withers |
| 7,674,040 | B2 | 3/2010 | Dowd |
| 8,469,593 | B2 | 6/2013 | Price et al. |
| 2002/0090151 | A1 | 7/2002 | Skeens et al. |
| 2002/0153273 | A1 | 10/2002 | Mallik |
| 2002/0173414 | A1 | 11/2002 | Leighton |
| 2003/0169948 | A1 | 9/2003 | Fenzl et al. |
| 2003/0177619 | A1 | 9/2003 | Cisek |
| 2003/0210836 | A1 | 11/2003 | Strand |
| 2003/0223654 | A1 | 12/2003 | Gerrits |
| 2003/0223657 | A1 | 12/2003 | Belias et al. |
| 2004/0001650 | A1 | 1/2004 | Piechocki et al. |
| 2004/0078940 | A1 | 4/2004 | Ishizaki |
| 2004/0234172 | A1* | 11/2004 | Pawloski ........... B65D 33/2541 24/585.12 |
| 2004/0261229 | A1* | 12/2004 | Cisek ....................... B29D 5/10 425/327 |
| 2005/0063616 | A1 | 3/2005 | Chang |
| 2005/0141786 | A1 | 6/2005 | Piechocki et al. |
| 2005/0271308 | A1 | 12/2005 | Pawloski |
| 2005/0276524 | A1 | 12/2005 | Taheri |
| 2005/0286810 | A1 | 12/2005 | Sprague et al. |
| 2005/0286811 | A1 | 12/2005 | Sprague et al. |
| 2005/0286812 | A1 | 12/2005 | Sprague et al. |
| 2006/0165316 | A1 | 7/2006 | Cheung |
| 2007/0183692 | A1 | 8/2007 | Pawloski |
| 2007/0206888 | A1 | 9/2007 | Chang |
| 2008/0292222 | A1 | 5/2008 | Snoreck |
| 2008/0137995 | A1 | 6/2008 | Fraser et al. |
| 2008/0159662 | A1 | 7/2008 | Dowd et al. |
| 2008/0285897 | A1 | 11/2008 | Taheri |
| 2009/0097781 | A1 | 4/2009 | Tang |
| 2009/0214141 | A1 | 8/2009 | Borchardt et al. |
| 2011/0299797 | A1 | 12/2011 | Petkovsek |

* cited by examiner

Mechanism = Closing

Oneway Analysis of Average Sound Level (dB) By Bag Type

Mechanism = Opening

Oneway Analysis of Average Sound Level (dB) By Bag Type

Zipper Sound Acquisition

RECLOSABLE BAG HAVING A LOUD SOUND DURING CLOSING

CROSS-REFERENCE TO RELATED APPLICATION

This application is a continuation of U.S. patent application Ser. No. 17/505,214, filed Oct. 19, 2021, which is a continuation of U.S. patent application Ser. No. 12/950,350, filed Nov. 19, 2010, issued as U.S. Pat. No. 11,180,286 on Nov. 23, 2021, which is a continuation-in-part of U.S. patent application Ser. No. 12/916,026 filed Oct. 29, 2010, issued as U.S. Pat. No. 9,327,875 on May 3, 2016, and U.S. patent application Ser. No. 12/916,005 filed Oct. 29, 2010, issued as U.S. Pat. No. 8,974,118 on Mar. 10, 2015, which are incorporated herein by reference.

BACKGROUND OF THE DISCLOSURE

1. Field of the Disclosure

The present disclosure relates to closure mechanisms for reclosable pouches, and more particularly, to such closure mechanisms that create a desirable sound for the user during closure.

2. Background of the Related Art

Thermoplastic bags are used to store various items. Typically, a closure mechanism allows selective sealing and unsealing of the bag. Use of closure mechanisms has been widely used and well understood in the art. Some examples are illustrated in the following: U.S. Pat. No. 3,656,147 discloses a plastic bag having male and female resealable interlocking elements integrally attached thereto for selectively opening and closing an end of the bag; U.S. Pat. No. 6,138,329 discloses a reclosable bag having an assembly that includes first and second male arrow-shaped profiles extending perpendicularly from a first base; and U.S. Pat. No. 6,167,597 discloses a zipper strip for a reclosable package, wherein the zipper strip includes a male and a female profile, wherein each male member has an asymmetrical arrow shape so that the zipper is easier to open from one side than the other.

Further, U.S. Pat. No. 6,953,542, issued to Cisek on Oct. 11, 2005, discloses a bag closure device with a stepped deflection of the closure device to result in a popping sound as the closure is opened or closed. U.S. Pat. No. 5,647,100, issued to Porchia et al. on Jul. 15, 1997 (the '100 patent), discloses a deforming head apparatus for creating indentations in a portion of a bag zipper to create a bumpy feel and/or an audible clicking sound upon opening and closing.

Still further, U.S. Pat. No. 5,140,727, issued to Dais et al. on Aug. 25, 1992 (the '727 patent), discloses a zipper for a reclosable bag which produced a bumpy feel and/or an audible clicking sound. The zipper of the '727 patent has two opposing, longitudinally extending interlockable rib and groove profiles configured so that intermittent parts of the profiles are structurally discontinuous along a length thereof. The intermittent parts are created by a deformer wheel such that the segments with indentions have lesser relative length than those segments without indentions so as to minimize the likelihood or incidence of liquid leakage through the interlocked zipper.

Despite the advances in zippers for plastic bags, deficiencies remain in that one cannot be sure that the zipper is properly closed to seal the bag. For example, although the zipper may produce an audible sound, the sound may not be easily heard or recognized as closing the bag by the user.

SUMMARY OF THE INVENTION

There is a need for an improved zipper which produces a desirable sound upon closing and opening that allows a user to clearly discern that the bag is adequately closed. The subject technology is directed to a zipper for a bag that produces a more optimal sound for the user. In one embodiment, the closure sound is a relatively lower frequency (i.e., deeper) and higher level (i.e., louder) sound.

In one embodiment, the subject technology is directed to a zipper for a reclosable bag including an elongated groove profile having two arms which form a general U-shape to define an opening to a channel, and an elongated rib profile opposing the groove profile. A plurality of first segments of the rib profile alternate with a plurality of second segments of the rib profile to create a structural discontinuity along a length thereof. The first segments have larger cross-sections and shorter lengths than the second segments such that interlocking the groove and rib profiles creates the audible clicking sound when the groove and rib profiles are engaged.

Preferably, a ratio of the length of the second segments to the length of the first segments is greater than one. For example, the length of the first segments is less than about 0.152 of an inch {3.86080 mm}, the length of the second segments is greater than about 0.157 of an inch {3.98780 mm}, and the channel generally has a transverse diameter of about 0.0375 of an inch {0.95250 mm}.

The rib profile also defines a stem extending from a base and terminating in a head, the stem being substantially unchanged between the first and second segments. A ratio of a thickness of the head to a thickness of the stem is about 2:1 in the first segments. In one embodiment, the thickness of the head in the first segments being in a range of 0.02989 inches {0.75921 mm} plus and minus one standard deviation of 0.00218 inches {0.0553720 mm} and the thickness of the head in the second segments is less than or equal to 0.0245 inches {0.62230 m}. The corresponding opening is about 0.010 of an inch {0.25400 mm} when the rib and groove profiles are separated. The groove profile includes a distal hook on each arm to provide: resistance to the rib profile interlocking within the channel; retention of the rib profile therein; and a sealing interface between the rib and groove profiles.

In another embodiment, the subject technology is directed to a zipper for a reclosable bag that generates audible sound continually therealong when interlocked. The zipper includes an elongated groove profile having two arms which form a general U-shape to define an opening to a channel, and an elongated rib profile opposing the groove profile. The rib profile includes a head to provide resistance to interlocking within the channel. A ratio of a thickness of the head of the rib profile to the opening of the groove profile is about 3:1 such that interlocking the groove and rib profiles creates the audible sound. The rib profile includes a stem extending from a base and terminating in the head and a second ratio of the thickness of the head to a thickness of the stem is about 2:1.

Still another embodiment is directed to an elongated including a groove profile having two arms which form a general U-shape to define an opening to a channel, and a rib profile opposing the groove profile, wherein the rib profile includes a head to provide resistance to interlocking within the channel and a ratio of a thickness of the head of the rib profile to the opening of the groove profile is about 3:1, and a plurality of first segments of the rib profile alternate with a plurality of second segments of the rib profile to create a structural discontinuity along a length thereof, the first segments having larger cross-sections and shorter lengths than the second segments such that interlocking the groove and rib profiles creates the audible clicking sound. Each of these zippers may also be used in recloseable pouches that define an interior by a first wall and a second wall opposing and partially sealed to the first wall to form a mouth for access to the interior.

Another embodiment of the subject technology is directed to a zipper for a reclosable bag including an elongated groove profile having two arms which form a general U-shape to define an opening to a channel, and an elongated rib profile opposing the groove profile, wherein a plurality of first segments of the rib profile alternate with a plurality of second segments of the rib profile to create a structural discontinuity along a length thereof, wherein during interlocking the groove and rib profiles, an audible clicking sound of at least 50 dB on average is created during opening and closing. Preferably, a ratio of the length of the second segments to the length of the first segments is greater than one and a ratio of a thickness of a head to a thickness of a stem of the rib profile is about 2:1 in the first segments.

Another embodiment is a zipper for a reclosable bag that generates audible sound therealong when interlocked. The zipper includes an elongated groove profile, and an elongated rib profile opposing the groove profile, wherein an audible clicking sound of at least 50 dB on average is created during closing. Preferably, the elongated groove profile has two arms which form a general U-shape to define an opening to a channel and the rib profile includes a head to provide resistance to interlocking within the channel, and the rib profile includes a stem extending from a base and terminating in the head, wherein a ratio of a thickness of the head to a thickness of the stem of the rib profile is about 2:1 in a plurality of segments.

In one embodiment, a plurality of first segments of the rib profile alternate with a plurality of second segments of the rib profile to create a structural discontinuity along a length thereof, the first segments having larger cross-sections and shorter lengths than the second segments, the thickness of the head in the first segments being in a range of 0.0299 of an inch {0.75946 mm} with a standard deviation of about 0.0022 of an inch {0.0.5588 mm}, the thickness of the head in the second segments is less than or equal to 0.0245 of an inch {0.62230 mm}, and the opening is about 0.010 of an inch {0.2540 mm} such that interlocking the groove and rib profiles creates an audible clicking sound.

Still another embodiment is a recloseable pouch defining an interior including a first wall, a second wall opposing and partially sealed to the first wall to form a mouth for access to the interior, and a closure mechanism for selectively sealing the opening. The closure mechanism includes an elongated groove profile having two arms which form a general U-shape to define an opening to a channel, and an elongated rib profile opposing the groove profile, wherein a plurality of first segments of the rib profile alternate with a plurality of second segments of the rib profile to create a structural discontinuity along a length thereof such that interlocking the groove and rib profiles creates an audible clicking sound of at least 50 dB on average during closing. Preferably, the zipper creates an audible clicking sound between 54 and 61 dB, and more particularly an audible clicking sound having an average of about 57 dB.

It should be appreciated that the present technology can be implemented and utilized in numerous ways, including without limitation as a process, an apparatus, a system, a device, a method for applications now known and later developed. These and other unique features of the technology disclosed herein will become more readily apparent from the following description and the accompanying drawings.

BRIEF DESCRIPTION OF THE DRAWINGS

So that those having ordinary skill in the art to which the disclosed system appertains will more readily understand how to make and use the same, reference may be had to the following drawings.

DETAILED DESCRIPTION OF PREFERRED EMBODIMENTS

Figure 1:
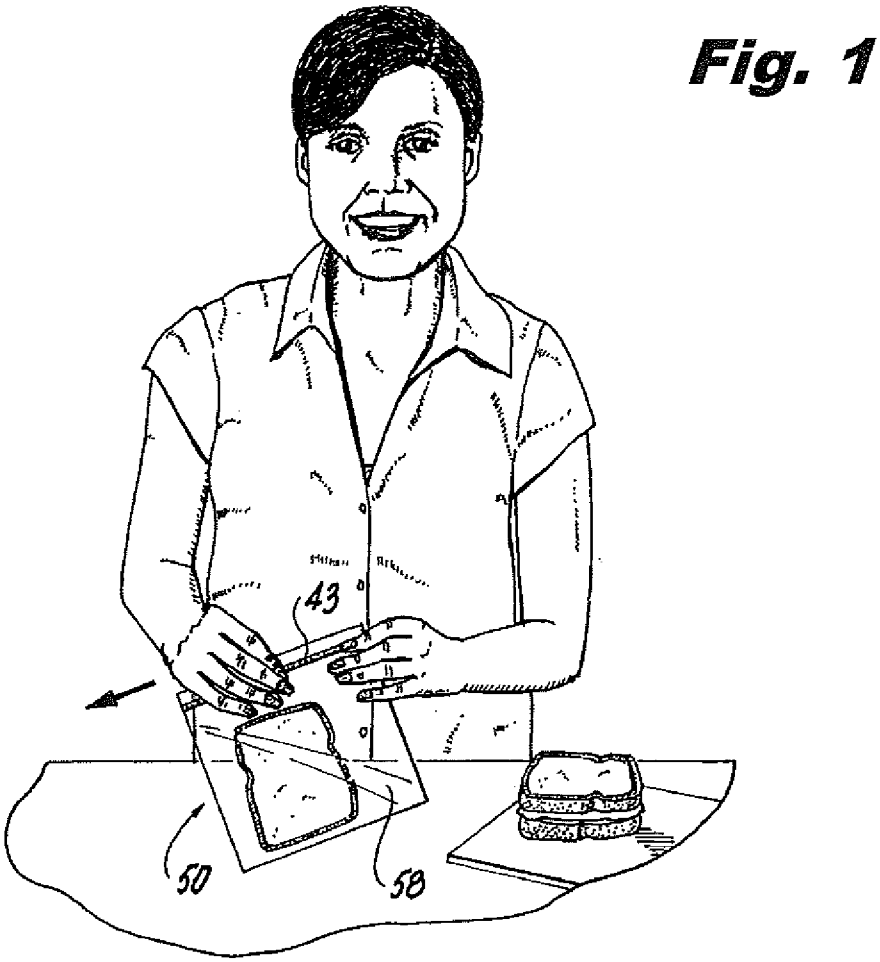
FIG. 1 is a perspective view of a reclosable pouch with a zipper in accordance with the subject technology being used by a person for storing a sandwich.

The present disclosure overcomes many of the prior art problems associated with sealing storage bags and the like. The advantages and other features of the technology disclosed herein, will become more readily apparent to those having ordinary skill in the art from the following detailed description of certain preferred embodiments taken in conjunction with the drawings which set forth representative embodiments of the present invention and wherein like reference numerals identify similar structural elements. Unless otherwise specified, the illustrated embodiments can be understood as providing exemplary features of varying detail of certain embodiments, and therefore, unless otherwise specified, features, components, modules, elements, and/or aspects of the illustrations can be otherwise modified, combined, interconnected, sequenced, separated, interchanged, positioned, and/or rearranged without materially departing from the disclosed systems or methods. It is also noted that the accompanying drawings are somewhat idealized in that, for example without limitation, features are shown as substantially smooth and uniform when in practice, manufacturing variances and abnormalities would occur as is knows to those of ordinary skill in the art.

Referring to FIG. 1, a plan view of a reclosable pouch 50 having a zipper 43 in accordance with the subject technology is shown. The zipper 43 is preferred by users because the zipper produces a desirable sound upon closing and opening that allows a user to clearly discern that the bag is adequately closed without significantly compromising the closing force or seal integrity. The closure sound is a relatively lower frequency (i.e., deeper) and higher level (i.e., louder) sound. The recloseable pouch 50 includes opposing walls 58 partially sealed to the first wall to form defines an interior and a mouth for access to the interior.

Figure 1A:
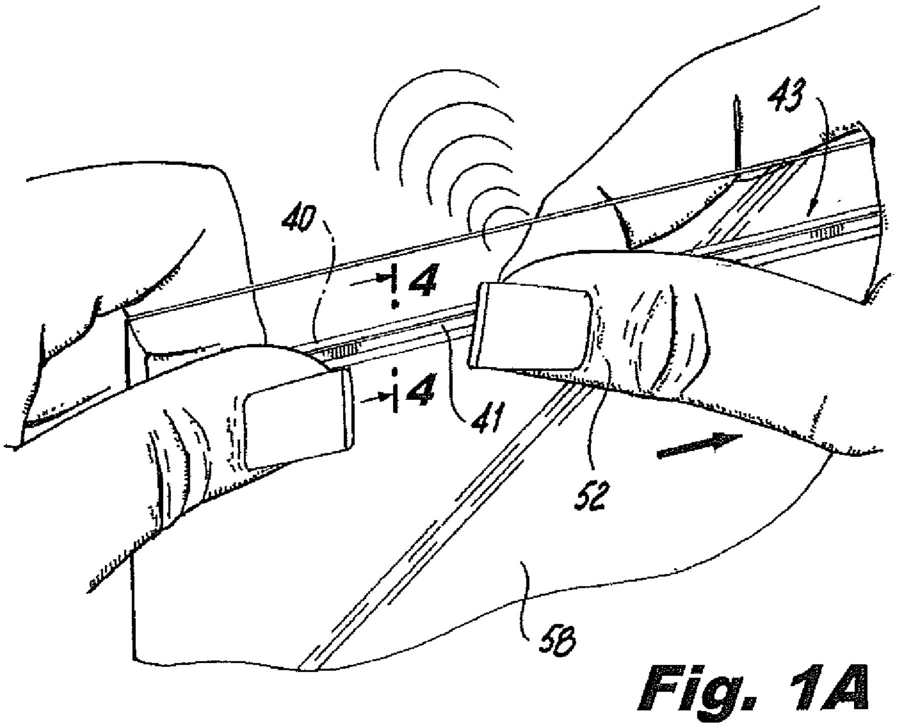
FIG. 1A is an enlarged isometric fragmentary view of the zipper in FIG. 1, wherein the rib and the groove profile are being interlocked by hand.

Referring to FIG. 1A, a zipper 43 of a preferred embodiment is shown being interlocked by the thumb 52 of a hand. The thumb 52 engages opposing longitudinally extending interlockable rib and groove profiles 40, 41. Without being bound by any particular theory, it is believed that the zipper 43 produces a relatively more effective and desirable audible clicking sound when the zipper profiles 40, 41 are interlocked due to intermittent discontinuity in structure along portions of either or both of the rib profile 40 or the groove profile 41. The discontinuity in structure is typically in those portions of the opposing profiles which in conventional constructions contact each other when a zipper 43 is zipped. The new structure of the profiles 40, 41 creates a lower frequency and generates increased energy to result in the louder sound. The terms "rib profile" and "groove profile" are used as terms of convenience to describe opposing interlockable male and female zipper profiles, and are not to be construed as limiting.

The zipper profiles 40, 41 may also produce a vibratory or bumpy feel during closure. The audible clicking and vibratory or bumpy feel on zipping are considered separable features of the present technology. Accordingly, a zipper may produce an audible clicking sound when zipped without imparting a vibratory or bumpy feel and vice versa while still being within the scope of the present technology.

Figure 2:
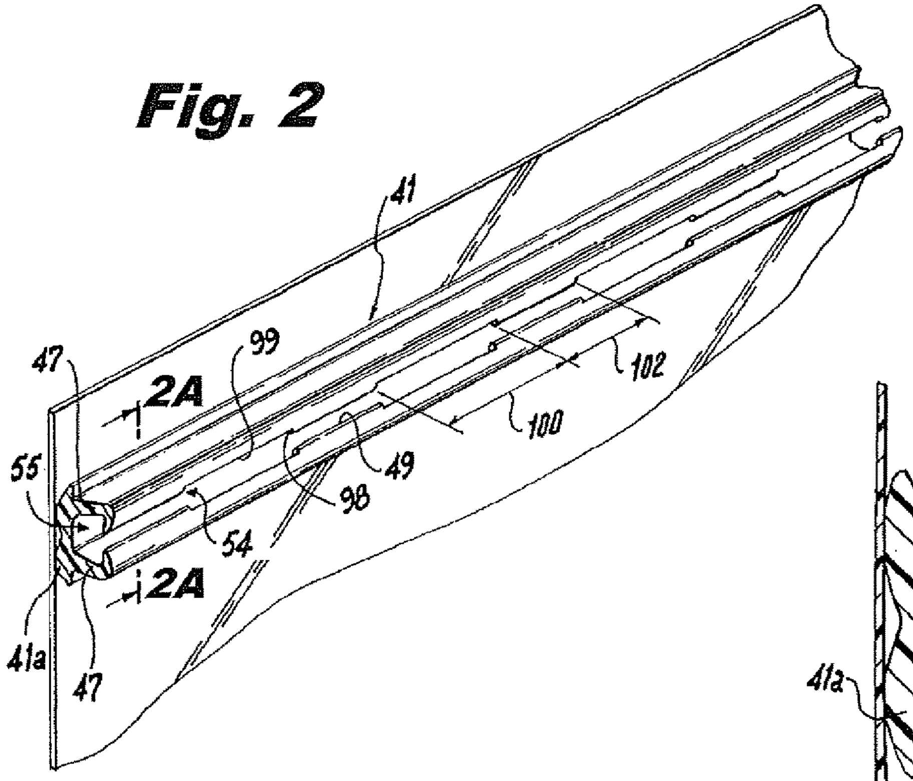
FIG. 2 is an enlarged isometric fragmentary view partly in section of the groove profile of the zipper shown in FIG. 1.
Figure 2A:
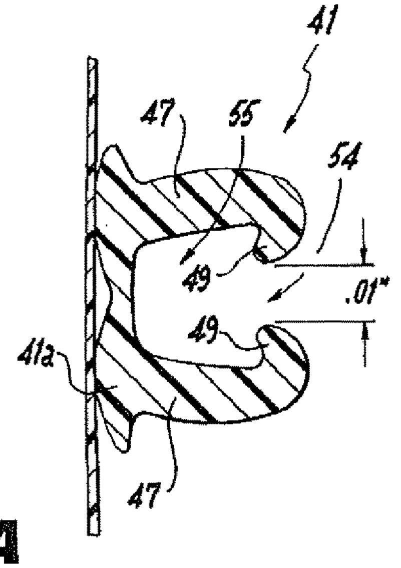
FIG. 2A is an enlarged cross-sectional view of the groove profile of FIG. 2 taken along line 2A-2A.

Referring now to FIGS. 2 and 2A, an enlarged isometric fragmentary view partly in section of the groove profile 41 of the zipper 43 and a cross-sectional view along line 2A-2A are shown, respectively. The groove profile 41 includes opposing groove arms 47 which extend from a groove base 41*a* in a general U-shaped to define an opening 54 to a channel 55. The channel 55 generally has a diameter of about 0.032 of an inch {0.81280 mm}. The opening 54 is preferably about 0.010 of an inch {0.25400 mm} as noted on FIG. 2A. The groove profile 41 is further characterized by intermittent and preferably alternating first and second segments 100, 102.

In segments 100, groove arms 47 have hooks 49 at the distal free ends whereas in segments 102, the arms 47 have no such hooks. The indentions within segments 102 are manifest by the lack of such hooks. The groove arms 47 of segments 100 have surfaces 98 which are generally planar and perpendicular to the longitudinal extension of the groove arms 47. Segments 102 define surfaces 99 which are generally planar and positioned at about right angles to surfaces 98.

Figure 3:
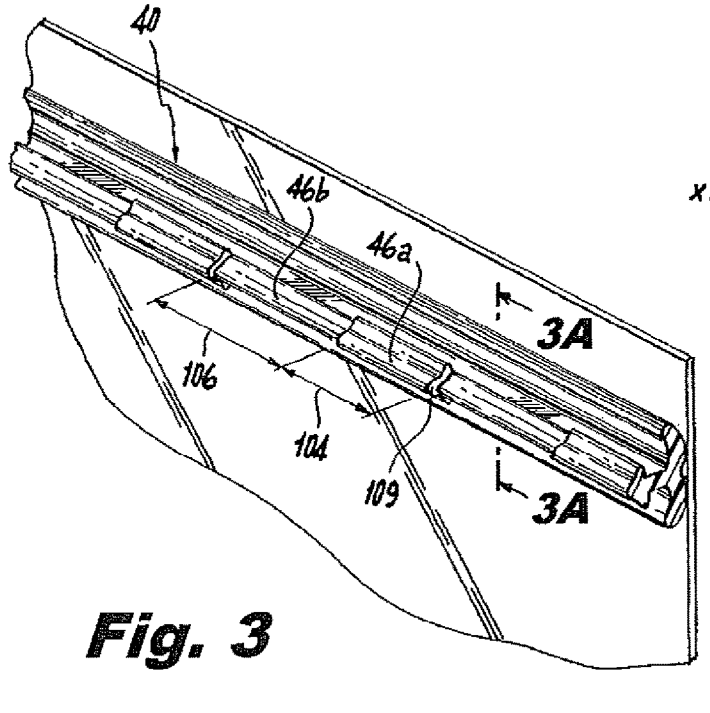
FIG. 3 is an enlarged isometric fragmentary view partly in section of the rib profile of the zipper shown in FIG. 1.
Figure 3A:
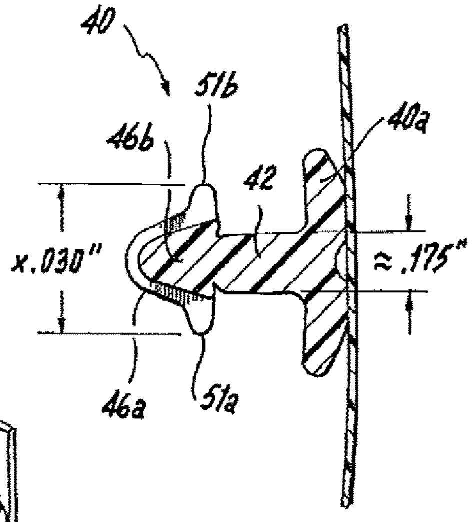
FIG. 3A is an enlarged cross-sectional view of the rib profile of FIG. 3 taken along line 3A-3A.

Referring now to FIGS. 3 and 3A, an enlarged isometric fragmentary view partly in section of the rib profile 40 of the zipper 43 and a cross-sectional view along line 3A-3A are shown, respectively. The rib profile 40 defines a stem 42 extending from a rib base 40*a* (see FIG. 4) to terminate distally in a head portion 46*a*, 46*b*. The rib profile 40 also defines intermittent and preferably alternating first segments 104 and second segments 106. The segments 104, 106 have different shapes, which create a structural discontinuity. The head portion 46*a* of segments 104 has a relatively larger cross-section than the head portion 46*b* of the segments 106. The rib profile 40 may also include ribs extending parallel on each side of the rib profile 40 and other features such as would be known by those of ordinary skill in the art.

The segments 104 and the head portion 46*a*, 46*b* have surfaces 109, which interact with the groove profile 41 to create an audible clicking noise and a bumpy feel during closing. The surfaces 109 also produce an audible clicking noise and a bumpy feel during opening the profiles 40, 41 as well. Although shown as having a transition area between the segments 104, 106 that is at about right angles to the length of the rib profile 40, the transition between the segments 104, 106 may taper somewhat.

Figure 4A:
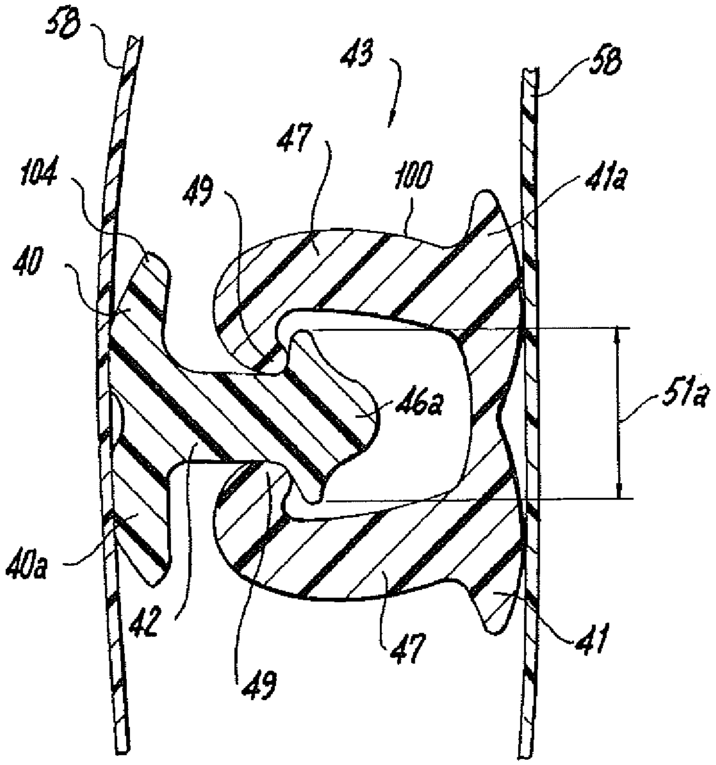
FIG. 4A is an enlarged cross-sectional view through an undeformed section of the rib profile of the zipper of FIG. 1 in a sealed position.
Figure 4B:
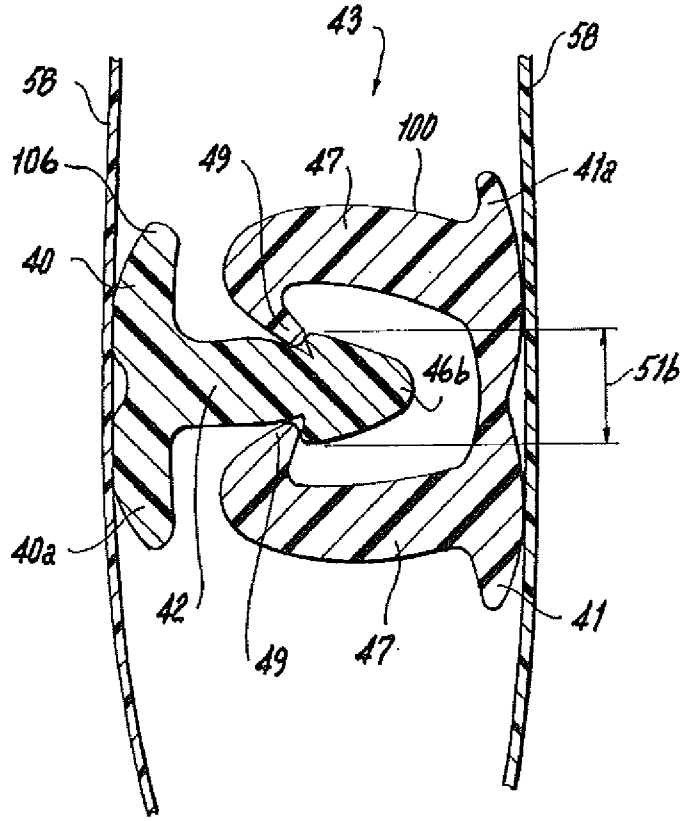
FIG. 4B is an enlarged cross-sectional view through a deformed section of the rib profile of the zipper of FIG. 1 in a sealed position.

Referring now additionally to FIGS. 4A and 4B, enlarged cross-sectional views of the zipper 43 of FIGS. 1-3 through sections 104, 106, respectively, are shown in a sealed position. The rib profile 40 and the groove profile 41 interlock along their essentially continuous to provide a seal. Although structurally discontinuous, the profiles 40, 41 have the necessary surfaces to provide a substantially leak-proof seal along the entire length thereof.

Still referring to FIGS. 3 and 3A, in the segments 104, the head portion 46*a* is somewhat triangular or arrowhead shaped in cross-section with a widest portion 51*a* adjacent the stem 42. The shape of the head portion 46*a* is not limited to the embodiment shown and may be more or less triangular, bulbous, or round with variations thereto for creating protrusions, hooks, and the like. The widest portion 51*a* is oversized as compared to the prior art with a preferred width of 0.029 to 0.031 of an inch {0.73660 to 0.78740 mm} for a corresponding opening 54 of the groove profile 41 of 0.030 of an inch {0.76200 mm}. The over-sizing of the widest portion 51*a* helps create a louder noise during opening and closing of the zipper 43.

In the segments 106, the head portion 46*b* is generally deformed at the widest portion 51*b* to a more generally bulbous shape. The term "bulbous" as used herein includes not only rounded cross-sections but also a generally arrow-shaped, triangular-shaped, quatrefoil-shaped, and like configurations in cross-section as may be created during deformation. Preferably, the deformation within segments 106 is largely removal of the widest part 51*b* of the head portion 46 of the segments 104 comparatively.

Still referring to FIGS. 4A and 4B, when segments 106 of the rib profile 40 and segment 100 of the groove profile 41 interlock, the groove arms 47 straddle the head portion 46 to retain the profiles 40, 41 in the closed, sealed position. The widest portions 51*a*, 51*b* of the head portion 46 engage and are interlockingly coextensive with the hooks 49 of the groove arms 47. The points of contact between the rib profile 40 and the groove profile 41 provide sealing, which maintains the interior of the pouch 50 in a leak-proof manner. Preferably, the opening 54 between the hooks 49 of the groove arms 47 is smaller than the diameter of the stem 42 of the rib profile 40 to create the sealing contact points. In one embodiment, the opening 54 is 0.010 of an inch {0.25400 mm}, the diameter or width of the stem 42 is about 0.015 to about 0.020 of an inch {0.38100 to 0.50800 mm}, and the head portion 46 is about 0.030 of an inch {0.76200 mm}.

Zippers of the present technology may have a plurality of intermittent or alternating segments of differing shape along one or both of the profiles, but preferably have intermittent or alternating segments of two different shapes as in the embodiments illustrated herein. The segments of differing shape may be of equal or unequal length. Surprisingly, the segments having intentions or deformations of greater relative length than those segments not having indentions optimizes the resulting audible clicking noise according to user preference without a loss in performance despite conventional wisdom that such an arrangement would perform poorly.

Preferably, a ratio of the length of the deformed segments 106 to the length of the undeformed segments 104 is greater than one. More preferably, the length of the undeformed segments is less than about 0.152 of an inch {3.86080 mm} and the length of the deformed segments 106 is greater than about 0.157 of an inch {3.98780 mm}. In one embodiment, the length of each segment with an indentation is preferably about 0.175 of an inch {4.44500 mm} whereas segments without an indentation are about 0.147 of an inch {3.73380 mm}.

In Operation

Again, while not bound by any particular theory, the audible clicking sound and the vibratory or bumpy feel associated with the zipper 43 are believed to result from the hooks 49 of the groove arms 47 contacting the planar surfaces 107 and 109 of head 46 as the profiles 40, 41 are interlocked along the length of the zipper 43. The extended length of the deformed segments 102, 104 contributes to the lower frequency of the sound and the oversizing of the head portion 46*a*, 46*b* with respect to the opening 54 contributes to the louder sound. The various elements of the profiles 40, 41 are proportioned and configured so that an optimal audible indication of closure is provided surprisingly without compromising the seal between the profiles 40, 41 or making the profiles 40, 41 too stiff to close or interlock without applying excessive force.

To provide an indication of the proportions of the various elements of the profiles 40, 41 with respect to one another for accomplishing these purposes, it has been found desirable for the upper laterally-disposed portions of the head 46*a* in segments 104 to be sized so that the widest part 51*a* the head portion 46*a* does not push the groove profile 41 open after insertion. The widest part 51*a* of the head portion 46*a* is substantial enough to provide some resistance to the interlocking of the profiles 40, 41 and, in this regard, are each preferably from about 0.029 to about 0.031 inches thick {0.73660 to 0.78740 mm} (measured from side to side at a maximum width).

The corresponding groove profile 41 is preferably dimensioned so that the opening 54 or juncture of the groove arms 47 with the hooks 49 is about 0.006 to about 0.015 of an inch {0.15240 to 0.38100 mm}. Generally, the groove arms 47 are from about 0.015 to about 0.019 inches {0.38100 to 0.48260 mm} apart. In a preferred embodiment, the opening 54 to the channel 55 is approximately 0.010 of an inch {0.25400 mm}. The hooks 49 are preferably from about 0.006 to about 0.020 inches {0.15240 to 0.50800 mm} in length, and the groove base 41*a* is preferably from about 0.005 to about 0.020 of an inch {0.12700 to 0.50800 mm} in thickness.

As would be appreciated by those of ordinary skill in the pertinent art, the subject technology is applicable to any type of bag, pouch, package, and various other storage containers with significant advantages for sandwich and quart size bags. The subject technology is also particularly adaptable to double zipper or closure mechanisms such as shown in U.S. Pat. No. 7,137,736 issued on Nov. 21, 2006 to Pawloski et al. and U.S. Pat. No. 7,410,298 issued on Aug. 12, 2008 also to Pawloski, each entitled "Closure Device for a Reclosable Pouch" and incorporated herein by reference in their entireties. In a multiple closure mechanism arrangement, such as a double zipper arrangement, the subject technology may be used for one or both of the closure mechanisms.

A Process and Apparatus for Making the Zipper

Figure 5:
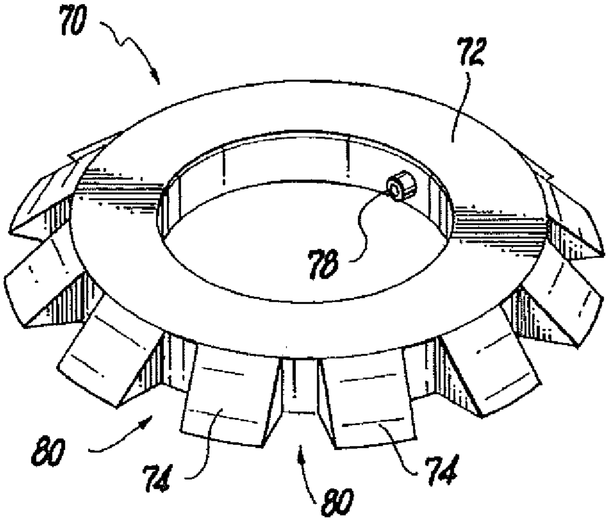
FIG. 5 is perspective view of a deformer ring for use in a deforming apparatus in accordance with the subject technology.
Figure 6:
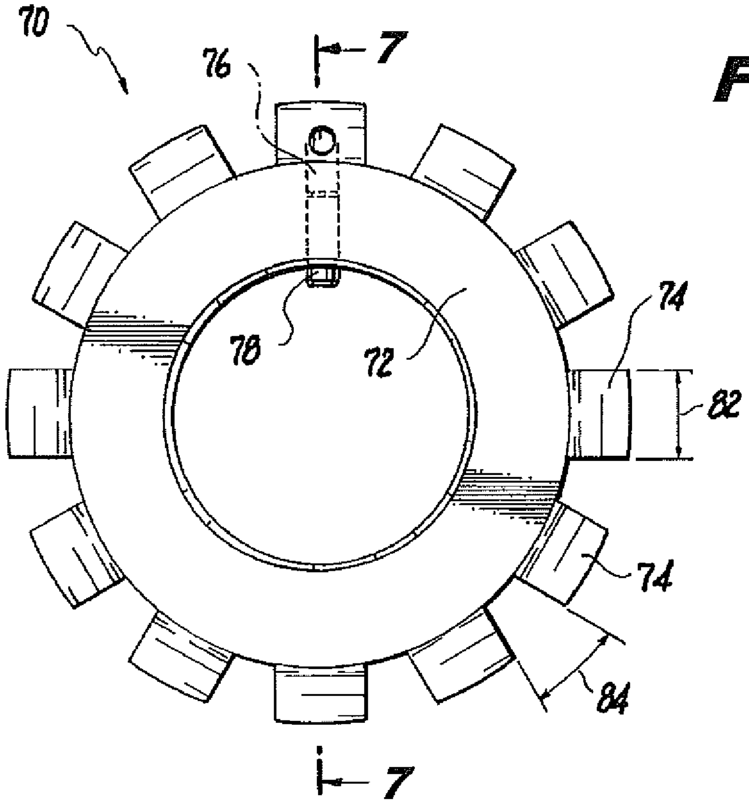
FIG. 6 is top view of the deformer ring of FIG. 5.
Figure 7:
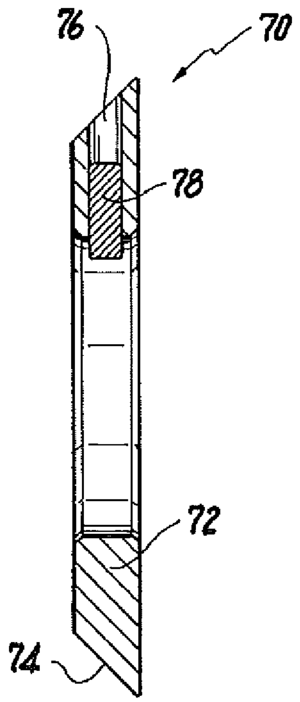
FIG. 7 is cross-sectional view of the deformer ring of FIG. 6 taken along line 7-7.

Now referring to FIGS. 5-7, perspective, top, and cross-sectional views of a deformer ring 70 for use in a deforming apparatus (not shown) in accordance with the subject technology are shown. The deforming apparatus may be that as shown in the '727 patent or the '100 patent. The deformer ring 70 may also be implemented in other deforming apparatus now known and later developed.

The deformer ring 70 has an annular body 72 with a plurality of teeth 74 formed on an outer circumference thereof. A throughbore 76 is formed in the annular body 72 to receive a dowel 78, which facilitates mounting the deformer ring 70 to the deforming apparatus. The teeth 74 are separated by gaps 80, which create a tooth arc length 82 and gap arc length 84 on the outermost portion of the deformer ring 70. In use, it is the size of the tooth arc length 82 and the gap arc length 84 that form the structural discontinuity in the profiles 40, 41. Preferably, the tooth arc length 82 is about 0.175 of an inch {4.44500 mm} and the gap arc length 84 is about 0.148 of an inch {3.75920 mm}.

One process for making a thermoplastic zipper 43 for a reclosable thermoplastic bag using the deformer ring includes the step of continuously extruding a longitudinally extending first zipper profile having a part interlockable with a longitudinally extending opposing second zipper profile while restricting at intervals the flow of molten polymer to a profile plate for forming the first zipper profile. Part of the first zipper profile is made intermittently structurally discontinuous along its length and defines at least a first undeformed segment of about 0.148 of an inch {3.75920 mm} and a second deformed segment of about 0.175 of an inch {4.44500 mm} therein characterized by cross-sections of different sizes but a common configuration imparting an audible clicking sound continually there along when the profiles are interlocked or separated from each other. The process may also interlock the first and second profiles so that the segmented part of the first profile is substantially free of interdigitation with the second profile.

An apparatus for making such a longitudinally extending zipper for a reclosable thermoplastic bag would include an extruder for providing longitudinally extending first and second profiles having a longitudinally extending part interlockable with a longitudinally extending opposing second zipper profile and a deformer ring for deforming the part to form indentions therein intermittently along its length at a desired spacing at any selected linespeed.

In one preferred embodiment of zipper 43, the undeformed segments 100, 104 of a length equal to about 0.147 of an inch {3.73380 mm} and deformed segments 102, 106 of a length equal to about 0.175 of an inch {4.44500 mm}. The thickness of the head portion 46*a* in the regular segments 104 of the rib profile 40 was about 0.02989 of an inch {0.75921 mm} and the thickness of the head portion 46*b* in the deformed segments 106 was about 0.0245 of an inch {0.62230 mm}. The opening 54 to the channel 55 of the groove profile 41 was about 0.010 of an inch {0.25400 mm} when the rib and groove profiles 40, 41 are separated.

Comparative Examples

A palmograph unit (shown and described in U.S. Pat. Nos. 5,154,086 and 5,647,100) is used to determine the degree of vibratory feel and the average closing force of prior art zippers and zippers in accordance with the subject technology. Generally, a palmograph unit performs three main functions: (1) closing the zipper; (2) monitoring the force required to close the zipper and the oscillations in closing force; and (3) analyzing the force required to close the zipper.

For palmograph values, prior art zippers as shown and described in FIG. 5 of U.S. Pat. No. 7,410,298 patent (the "prior art zipper") are tested. For comparison, a plurality of zippers in accordance with the subject technology or preferred zippers are also tested. The preferred zippers are similar to the prior art zippers in that each included first and second closure mechanisms. The inner or product side zipper was unchanged, namely a single hook for a male profile. However, the outer or consumer side zipper is the new and improved clicking zipper with the modifications described herein. The test bags utilized a film for sidewall of approximately 0.075 of an inch {0.1905 mm}.

The palmograph results surprisingly showed that closing force and palmograph values remained relatively unchanged. One of ordinary knowledge in the pertinent art would have expected the relatively larger deformed segments 100, 104 and/or the oversized head portion 46*a*, 46*b* would detrimentally impact the closing force.

Turning to measuring user preference (known as "paragon" values), the frequency of the audible clicking is an important factor in determining user preference. The same zippers were tested. The preferred embodiment in accordance with the subject disclosure exhibits a lower frequency or deeper sound, which was more easily heard, recognized, and preferred by users.

Figure 8:
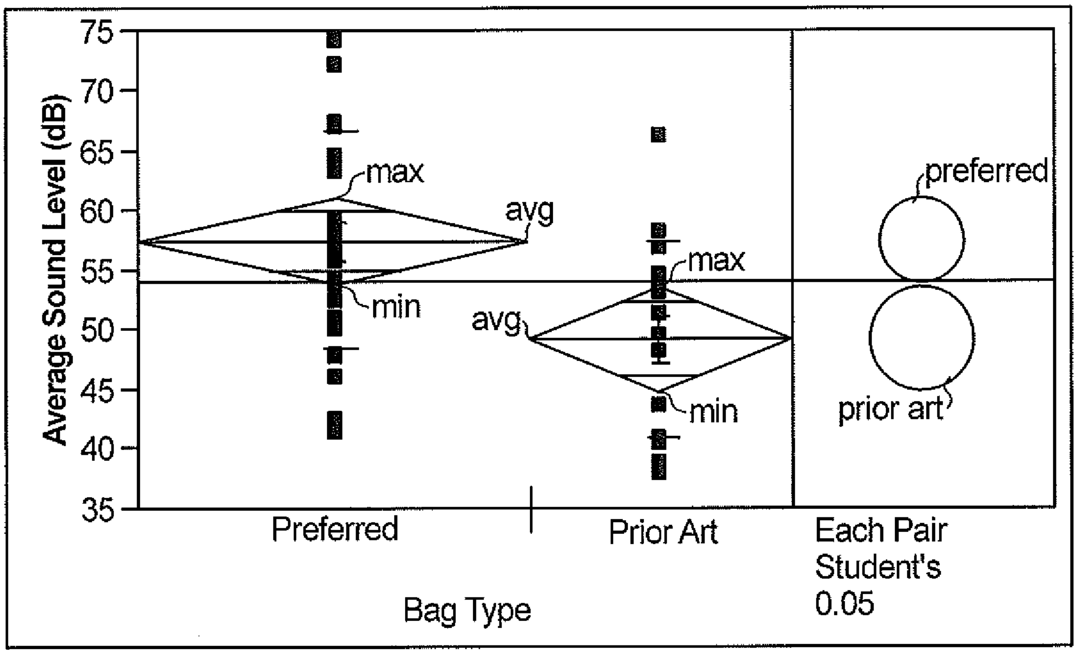
FIG. 8 is a graph of sound level during closing of a preferred embodiment of the subject technology in contrast with a prior art embodiment.
Figure 9:
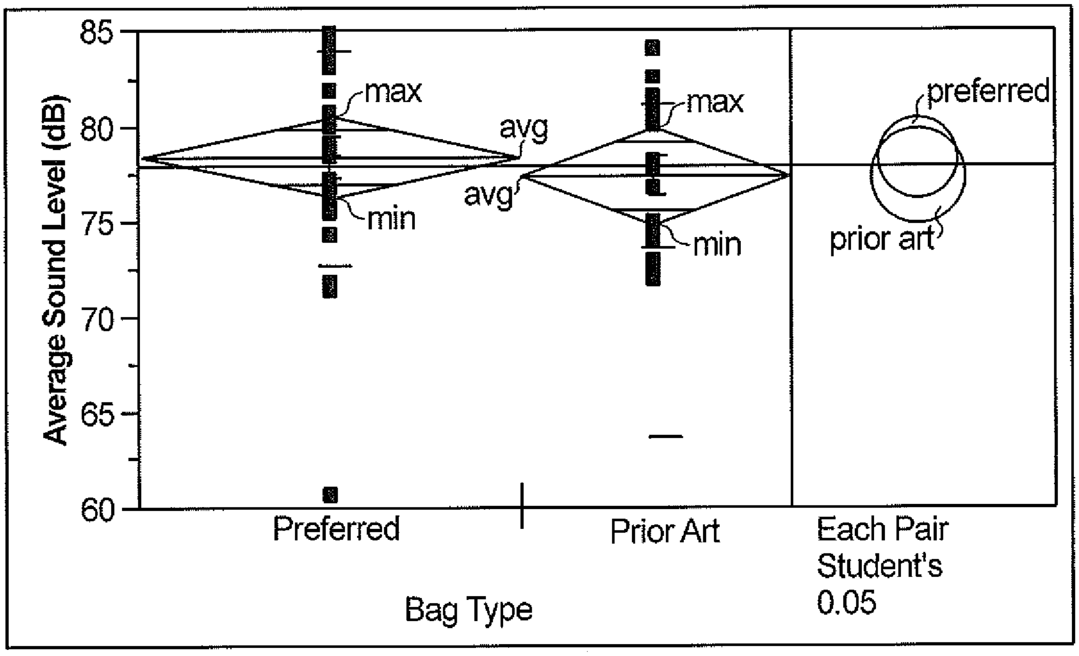
FIG. 9 is a graph of sound level during opening of a preferred embodiment of the subject technology in contrast with a prior art embodiment.

Referring now to FIGS. 8 and 9, graphs of sound level during closing and opening, respectively, of the same preferred zippers of the subject technology in contrast with the same prior art embodiment are shown. Referring to FIG. 8 in particular, the average sound level for the preferred zippers is about 57.37 dB whereas the prior art zippers is about 49.10 dB, which makes for a significant 8.27 dB increase. The results are also presented graphically as each pair students t, which further illustrate how the preferred embodiment generates a louder sound.

Measuring the Zipper Sound Level

Figure 10:
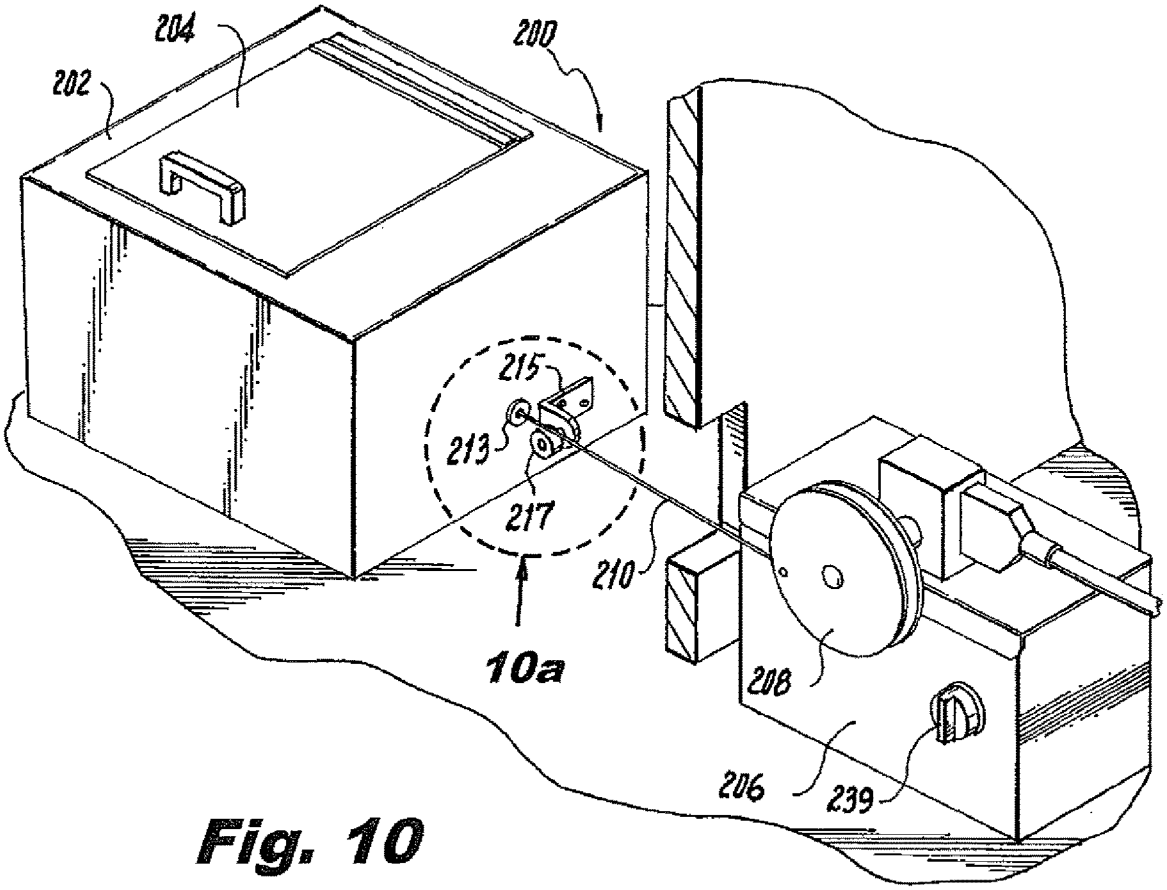
FIG. 10 is a perspective view of a sound acquisition system in a closed condition, including the adjacent and isolated motor utilized for testing the acoustic properties of a zipper in accordance with the subject technology.

Referring now to FIG. 10, a perspective view of a sound acquisition system 200 for capturing the acoustic properties of a zipper in accordance with the subject technology is shown. The sound acquisition system 200 captures the sound of a zipper being opened or closed as a waveform in a date recorder (not shown). The data recorder may include a variety of different components such as an adapter for power and the like, amplifiers, power supplies, connecting cables, a preamplifier, a computer and the like to accomplish the functions described herein and not explicitly shown for clarity. The data recorder converts the sound or waveform into A-weighted decibel readings (dBA) for each click.

Figure 10A:
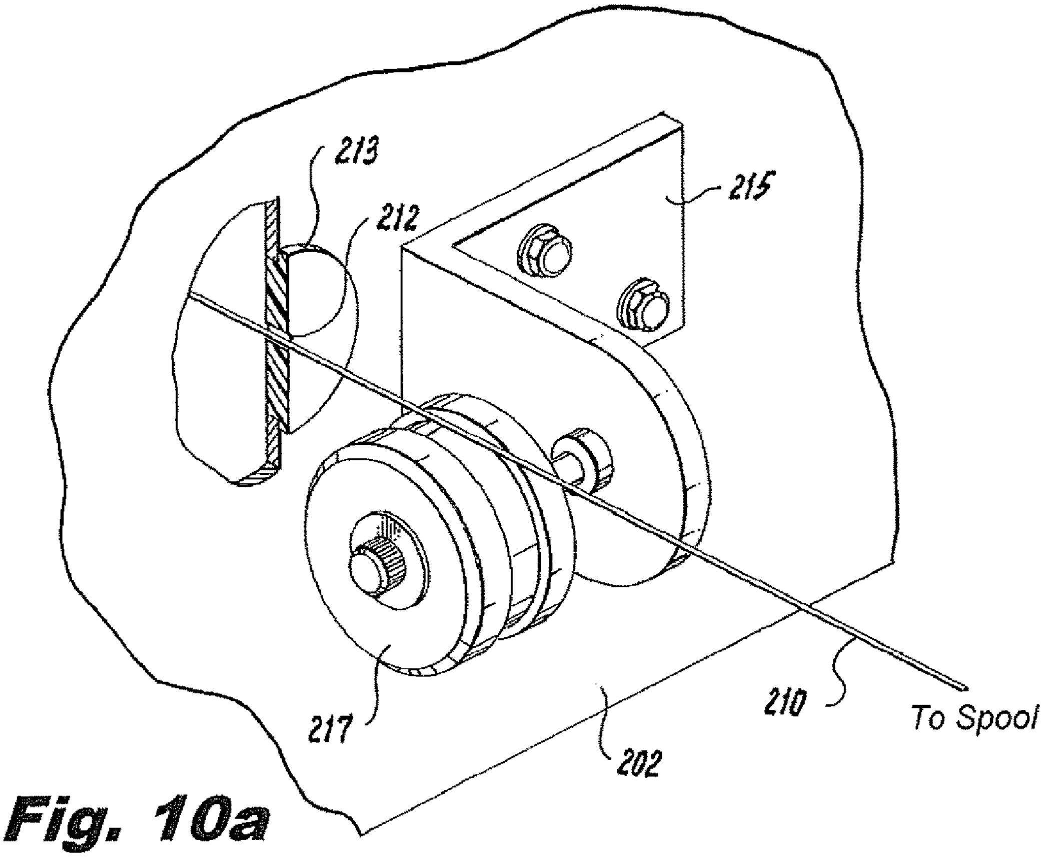
FIG. 10*a* is an enlarged detailed view of the area in circle 10*a* of FIG. 10.

The sound acquisition system 200 includes a chamber 202 defining a sound dampening interior. The chamber 202 has an opening covered by a door 204, shown in a closed condition. The sound acquisition system 200 also includes an adjacent and preferably isolated motor unit 206 utilized for actuating opening and closing of zippers 43. The motor unit 206 rotates a spool 208 to wind and unwind thread 210 coupled to the zipper 43. An actuation switch 239 can turn the motor unit 206 on to move the spool 208 at a substantially consistent speed so that the resulting opening and closing occurs at a consistent speed. The thread 210 couples to the zipper 43 in an interference free manner. Referring now additionally to FIG. 10*a*, the thread 210 passes through an aperture 212 formed in a nylon grommet 213 in the chamber 202. A bracket 215 holds a rotatably mounted nylon wheel 217 to further guide the thread 210 through the aperture 212 so that potential rubbing sound from the thread 212 is not captured with the chamber 202. Within the interior of the chamber 202, the motor thread 210 terminates in a clip assembly 224 for attaching to the zipper 43.

Figure 11:
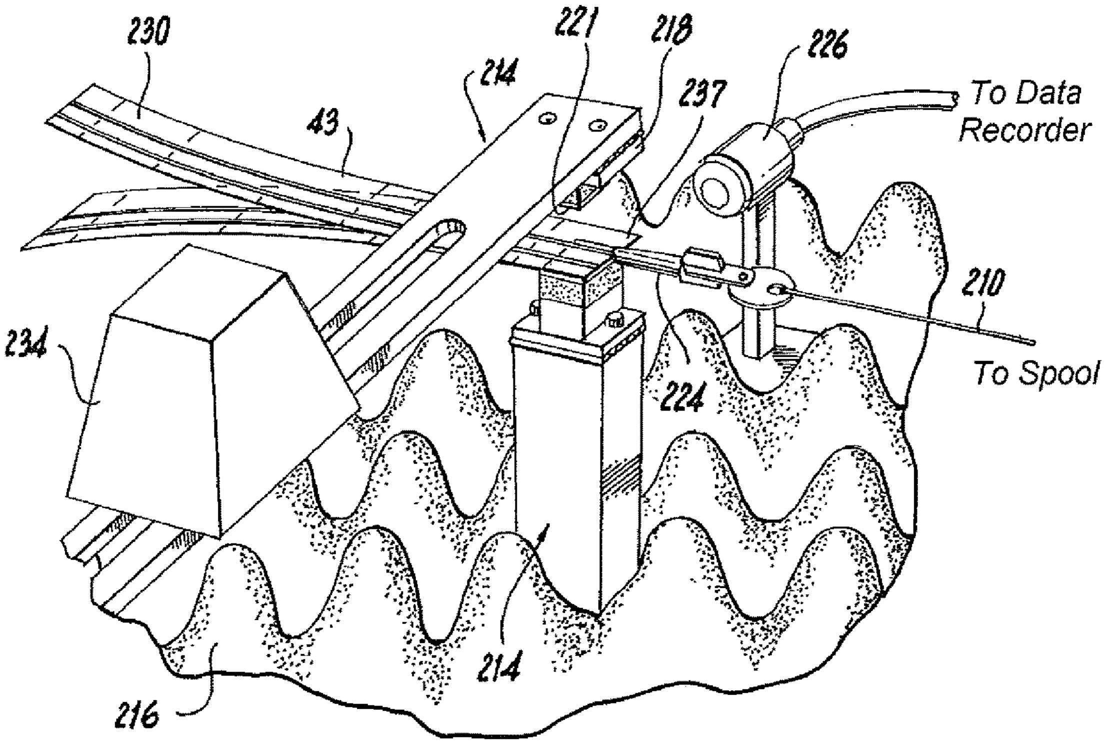
FIG. 11 is a local perspective view of the interior of the sound acquisition system, showing the acoustic testing components and a zipper sample staged for testing.

Referring now to FIG. 11, a local perspective view of the interior of the sound acquisition system 200 shows a zipper 43 staged for testing. It is worth noting that the zipper 43 may be any desired zipper and is shown with a majority of the bag removed for ease of testing. The zipper 43 may also be tested prior to attachment to the sidewalls of a pouch.

Figure 13:
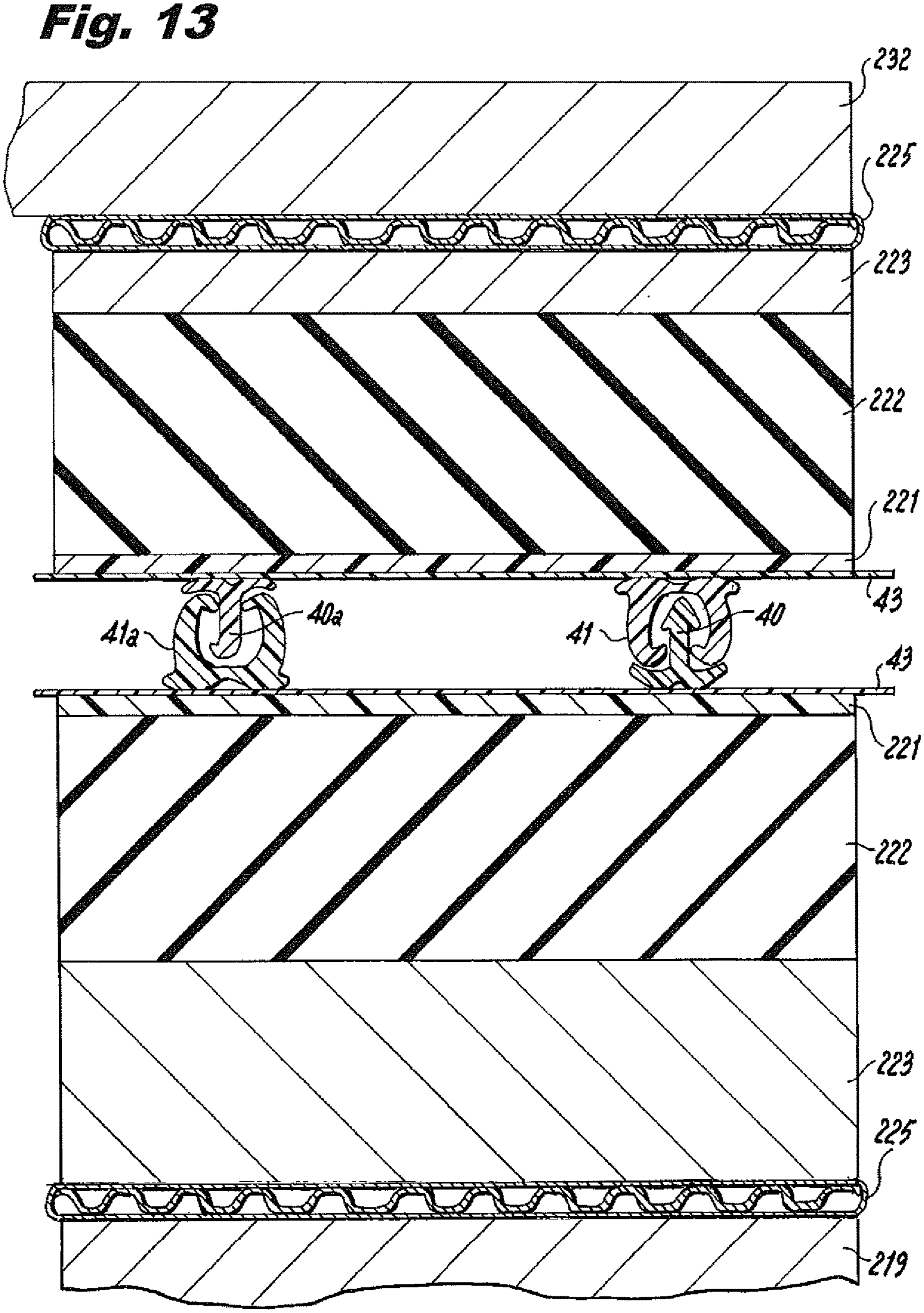
FIG. 13 is a sectional elevation taken at cutline 13-13 of FIG. 12, showing the male and female zipper components passing through the closing fixture.

Within the interior, a fixture 214 selectively provides an opening or closing force against the zipper 43 under test. The fixture 214 includes a fixed lower pedestal 219 surrounded by egg crate foam or other sound dampening material 216 and a rotatably mounted arm 232. The pedestal 219 and arm 232 have adapters 218 for engaging the zipper 43 to provide a closing force. The adapters 218 are roughly T-shaped to provide opposing distal low friction planar surfaces 221 as best seen in FIG. 13. The planar surfaces 221 are preferably formed by a nylon screen adhered to a block 222. The block 222 is preferably rubber and secured to a larger metal block 223. The metal block 223 may define countersunk bores for receiving a fastener(s) and/or a pin in order to securely mount the adapter 218 to the respective pedestal 219 and arm 232. Corrugated cardboard 225 is sandwiched between the blocks 223 and respective pedestal 219 and arm 232 to provide vibrational dampening. To close a zipper 43, the arm 232 is rotated into position so that the surface 221 on the arm adapter 218 rests on the surface 221 of the pedestal adapter 218. The arm 232 has a slidable weight 234 so that the amount of force between the surfaces may be adjusted approximately equal the minimal force required for closing the zipper 43. As the closing force of the zipper under test varies, the placement of the weight is adjusted to vary the applied force. The chamber 202 may also deploy various sensors and the like (not shown) that provide further information to the data recorder. For example, the temperature, pressure and humidity may be controlled and monitored within the interior of the chamber 202.

A microphone assembly 226 also mounts within the interior adjacent the pedestal 219 to capture the sound therein. Preferably, the microphone assembly 226 is moveably mounted so that a distance to the pedestal 219 can be adjusted as desired. The microphone assembly 226 connects to the data recorder. The microphone assembly 226 includes a plastic cap (not shown) to protect the microphone diaphragm from dust and incidental contact. The protective cap should only be removed from the microphone assembly 226 when making measurements after powering up the sound acquisition system 200. When not in use, the protective cap is replaced and care should be taken to not touch the microphone diaphragm or allow any object to come in contact therewith.

Figure 12:
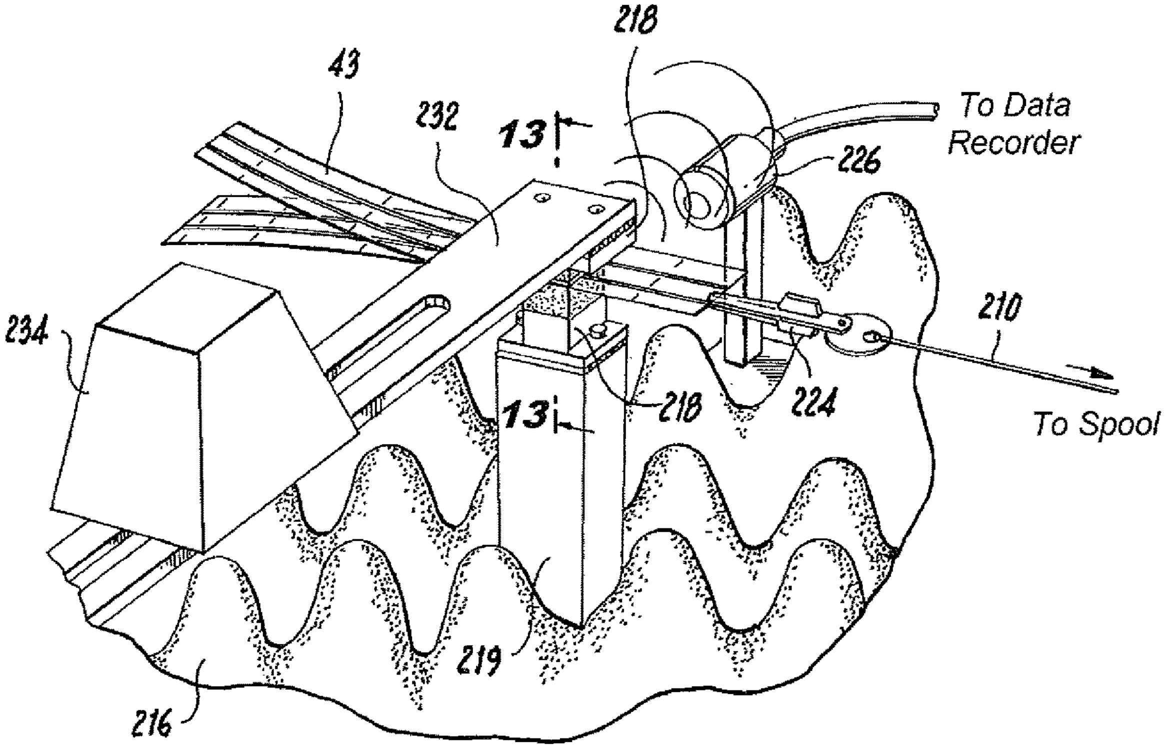
FIG. 12 is similar to FIG. 11, but showing the zipper being closed and the resultant sound being recorded.

For capturing sound during closing, the zipper 43 is partially interlocked so that an engaged or closed end 237 of the profiles 40, 41 can be placed between the opposing surfaces 221 with the opening towards the microphone assembly 226. The clip assembly 224 attaches to the closed end 237 of the zipper 43 and the door 204 to the chamber is closed. The motor unit 206 is activated to rotate the spool 208, pulling the thread 210 and, in turn, drawing the zipper 43 through the surfaces 221. As the open end 230 of the zipper profiles 40, 41 passes through the adapters 218, the profiles 40, 41 are urged together into an interlocking position with the resulting sound described above. FIG. 12 shows a local perspective view similar to FIG. 11 with the zipper 43 being closed and the resultant sound being recorded. Care should be taken so that the thread 210 does not drag against the chamber 202 or otherwise create sound against the aperture 212, pedestal 219 or sound dampening material 216 during testing. Referring now to FIG. 13, a sectional elevation taken at cutline 13-13 of FIG. 12 illustrates the male and female profiles 40, 41 of a double zipper 43 in accordance with the subject technology passing through the adapters 218 during closing. For the double zipper 43 shown, profiles 40, 41 create substantially all of the recorded sound. The secondary profiles 40*a*, 41*a* are not configured to create appreciable sound.

The chamber 202 may also be configured to disengage the profiles 40, 41. The adapter 218 is removed from the pedestal 218 and the arm 232 is rotated out of the way. A different block (not shown) is mounted on the pedestal 219 that has an upstanding screw or finger. By placing an open end of a closed zipper over the upstanding screw, using the clip to connect the zipper, and drawing the zipper across the screw, the zipper is opened to record the sound generated thereby.

The pedestal 219 may also receive a block (not shown) for actuating a slider type zipper. The slider actuating block may be very similar to a slider commonly used as an actuating member for resealable packages, which is simply held in position by a shoulder formed on the slider block. Preferably, the shoulder forms an aperture to allow the zipper to easily and quietly pass. For a slider example, see U.S. Pat. No. 7,797,802 entitled "Actuating Member for a Closure Assembly and Method" issued on Sep. 21, 2010 to Ackerman, which is incorporated herein by reference in its entirety. Accordingly, for capturing sound during opening, the same basic components can be utilized but simply arranged in a reverse order of having a mostly closed zipper pulled there through.

The interior of the chamber also may deploy various sensors and the like (not shown) that provide further information to the data recorder. For example, the temperature, pressure and humidity may be controlled and monitored within the interior of the chamber 202.

After assembling the sound acquisition system 200, the process to collect the sound data may begin. Initially, turn on the power to the components including the microphone and data recorder and wait approximately 100 seconds for the capacitive circuits of the power supply and the like to charge before making measurements. Preferably, the data recorder has A-weighted sound for reduction of low frequency hum from, for example, HVAC systems and motors but the gain is applied to the non-weighted signal. Therefore, the power supply amplifier can be overloaded by low frequency hum if a high gain is used even though the level is relatively low after passing through the A-weighting conditioner.

The sound may be monitored with headphones from a de coupled output, which may have a slight de offset. If low frequency distortion is heard through the headphones or if a threshold voltage (e.g., 5 V) is exceeded on the microphone power supply, the gain on the microphone power supply should be reduced. The speed of the motor should be set such that individual clicks can be discerned. If the motor speed is set incorrectly, the sound data can have clicks discarded and the resulting filtered waveform reanalyzed. For overestimation of motor speed, fewer clicks can be used. For underestimation of motor speed, more clicks can be used.

The following is a description of a process for capturing the sound data. The process uses the following notation:

$A_B$=signal-to-noise ratio [V/V]
$A_Q$=quiescent amplitude threshold factor
$d_e$=typical distance between ear and zipper [inches]
$d_m$=distance between microphone and zipper [inches]
$f_t$=allowable zipping speed deviation of $V_m$ from $V_t$ expressed as Max $[V_m/V_t, V_t/V_m]$
$f_m$=allowable zipping speed deviation of v from $V_m$ expressed as $Max[V/V_m, V_m/V]$
$G_m$=microphone gain [dB]
$G_s$=power supply gain [dB]
$G_V$=voltage gain in data acquisition input module
K=microphone calibration constant (sensitivity) [V/Pa]
$P_{ref}$=$20\times10^{-6}$ Pa(rms)
$t_{c^+}$=time of maximum voltage during a click period [seconds]
$t_{c^-}$=time of minimum voltage during a click period [seconds]
$t_C$=time of click indicated by maximum click amplitude=$(t_{C^+}+t_{C^-}/2)$ [seconds]
T=period between successive clicks [seconds]
$T_m$=median period between clicks [seconds]
V=actual zipping speed between successive clicks [inches/sec]
$V_m$=actual median zipping speed [inches/sec]
$V_t$=target zipping speed [inches/sec]
$V_{c^+}$=maximum voltage in contiguous inspection time intervals associated with a click [Volts]
$V_{c^-}$=minimum voltage in contiguous inspection time intervals associated with a click[Volts]
$V_B$=filtered background amplitude [Volts]
$V_{max}$=maximum voltage in an inspection time interval [Volts]
$V_{min}$=minimum voltage in an inspection time interval [Volts]
$V_{p-p}$=peak amplitude in an inspection time interval; $V_{max}-V_{min}$ [Volts]
$V_Q$=quiescent voltage threshold [Volts]
$V_{rms}$=root-mean-square voltage [Volts]
□t=inspection time interval [seconds]
x=spacing between zipper deformations [inches]

Before testing any zippers, the sound acquisition system 200 is used to acquire a waveform of background noise. The background noise waveform is filtered using a 4-th order high pass Butterworth filter with a 500 Hz cutoff frequency, then the filtered background amplitude, $VB=2\sqrt{2}*V_{rms}$ is calculated in order to select a desired signal-to-noise ratio, e.g., $A_B=1.2$. An inspection time interval equal to about 5% of the expected median period between clicks should be used, e.g., □t=0.05*T=0.05*x/$V_t$ The following steps are preferably repeated for a statistically significant number of zipper samples. In this example, a closing or sealing test is performed. The sound acquisition system 200 acquires a waveform of a zipper clicking closed. The clicking waveform is filtered using a 4-th order high pass Butterworth filter with a 500 Hz cutoff frequency. The leading and trailing data are discarded where $V_{p\text{-}p}<A_B*V_B$. The user selects a quiescent voltage threshold gain, e.g. $A_Q=1.1$ and calculates a quiescent voltage threshold, $V_Q=A_Q*2\ 2*V_{rms}$.

Next, the sound acquisition system 200 removes the inspection intervals where $V_{max}$ or $|V_{min}|>V_Q/2$ and recalculates the quiescent voltage threshold, $V_Q=A_Q*{}^2\sqrt{2}*V_{rms}$ to yield a filtered waveform. By analyzing the filtered waveform, the sound acquisition system 200 determines a first quiescent period where $V_{max}$ and $|V_{min}|<V_Q/2$. From the first quiescent period, the sound acquisition system 200 determines the beginning of the next click period where $V_{max}$ or $|V_{min}|>V_Q/2$. Update $V_{c^+}$ and $V_{c^-}$. $V_{c^+}$ and $V_{c^-}$ are updated for successive inspection time intervals until a quiescent period is encountered. Determination of the beginning of the next click period and updating $V_{c^+}$ and $V_{c^-}$ are repeated until the end of waveform.

Upon reaching the end of the waveform, the sound acquisition system 200 evaluates the most recent click and discards the most recent click if the last time interval was not quiescent. The sound acquisition system 200 may provide a warning to the operator if $f_t$ is exceeded based on mode (most common) interval between clicks. If $f_t$ was not exceeded, the sound acquisition system 200 may proceed to eliminate the clicks acquired while accelerating at the beginning and decelerating at the end of the process according to the $f_m$ criteria, i.e., a large separation between clicks. The sound acquisition system 200 may also fill in missing clicks with the maximum and minimum over a sub-interval where a click should be.

Figure 14:
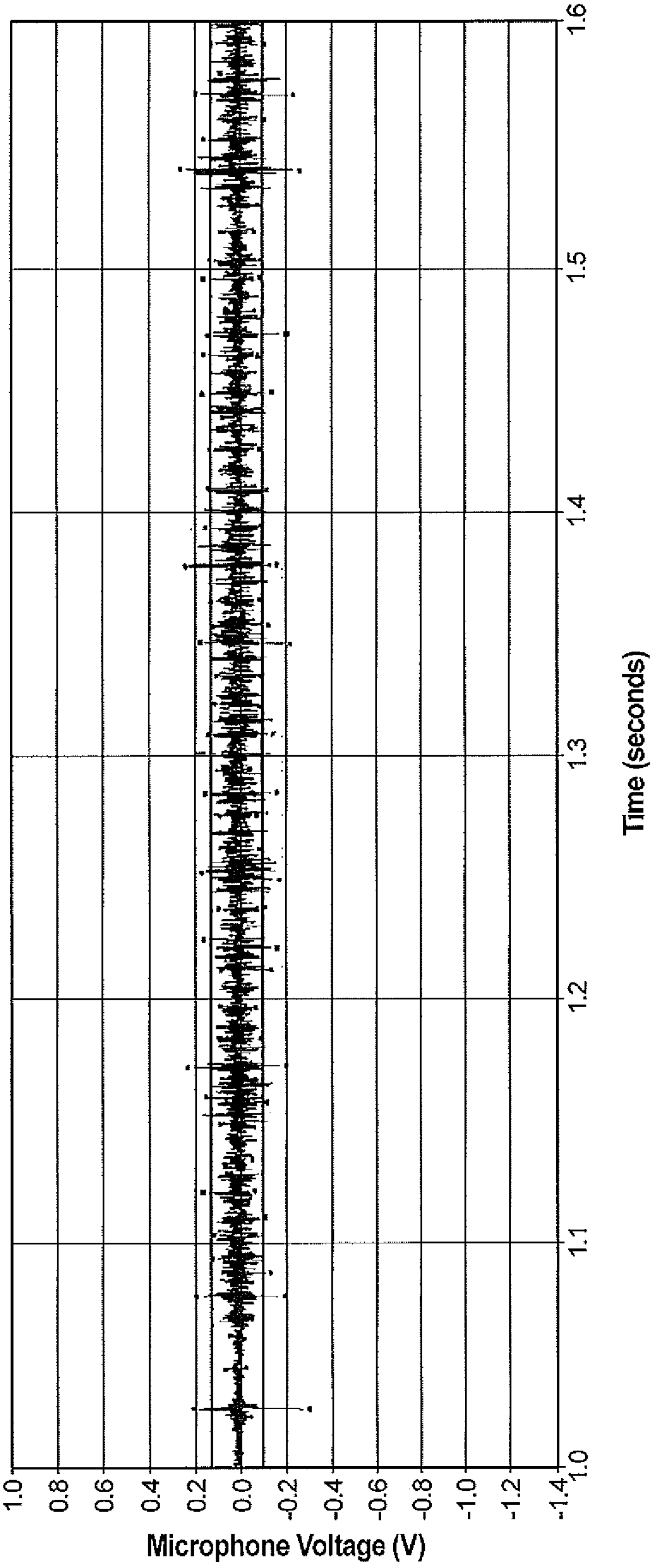
FIG. 14 is a voltage versus time waveform resulting from the sound capture by the sound acquisition system of a zipper being closed.

Upon finishing computation of the waveform, the data recorder of the sound acquisition system 200 records all the click voltage amplitudes for conversion into sound pressure levels as shown in FIG. 14, which is a voltage versus time waveform resulting from the sound capture by the sound acquisition system 200 of the zipper being closed.

The pressure level conversion utilizes the assumption that the root-mean-square amplitude of the click waveform can be effectively approximated by a sine wave to result in the following formula:

$$SPL(\text{dB}) = 20\log\left[\frac{V_{p-p}/\sqrt[2]{2}}{G_v \cdot K \cdot P_{ref}}\left(\frac{d_m}{d_e}\right)^2\right] - G_m - G_s$$

Figure 15:
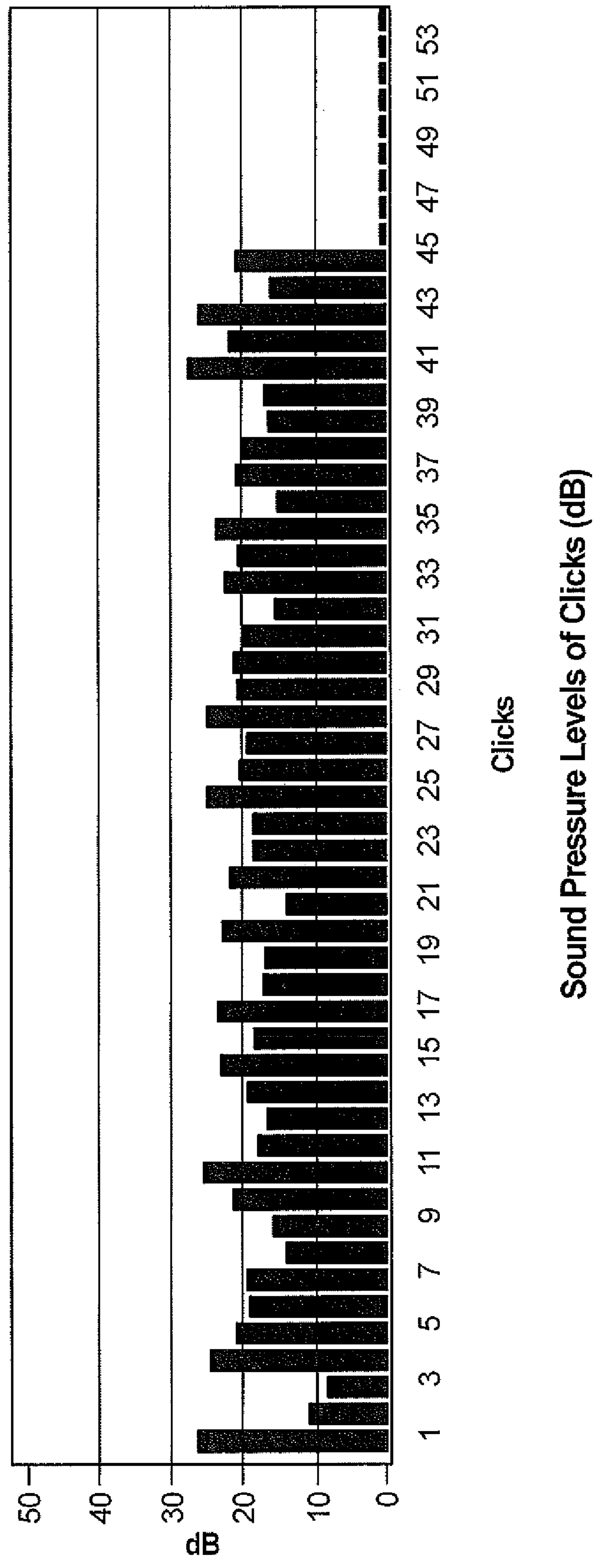
FIG. 15 is a bar graph depicting the sound pressure level as an A-weighted decibel level for each measured zipper click.

The sound acquisition system 200 calculate statistics to create a bar graph of the sound pressure level as an A-weighted decibel level for each measured zipper click as shown in FIG. 15.

Based upon testing, it has been determined that for frequencies below 4 kHz, the effects of ambient temperature and pressure over the ranges 16° C.-30° C. and 925 mbar-1025 mbar, are less than ±0.1 dB. Unless condensation forms, the effect of relative humidity is less than 0.1 dB. The long-term stability of the sound acquisition system 200 is very good, with less than a 1 dB change in 250 years. The sound acquisition system 200 has a linear 0° incidence free-field frequency response from 7 Hz to 12.5 kHz+2, −3 dB and a dynamic range of −2.5 dB(A)-102 dB.

Periodically, the microphone calibration should be checked as is known to those of ordinary skill in the pertinent art. The sensitivity adjustment related to the microphone should be adjusted so that $V_{rms}$=3.368V at linear output for power supply gain of 0 dB and pre-amp gain +20 dB. Also, an operator should use the measuring amplifier reference voltage and adjust sensitivity for the actual $K_0$ value given on the microphone's calibration chart.

In view of the above, the novel structure of the closure member of the present technology advantageously provides a significant unexpected improvement in paragon and loudness, surprisingly without detrimentally impacting palmograph performance or closing force compared to commercially available zippers.

All patents published patent applications and other references disclosed herein are hereby expressly incorporated in their entireties by reference.

While the invention has been described with respect to preferred embodiments, those skilled in the art will readily appreciate that various changes and/or modifications can be made to the invention without departing from the spirit or scope of the invention as defined by the appended claims. For example, each claim may depend from any or all claims in a multiple dependent manner even though such has not been originally claimed.

What is claimed is:

1. A reclosable pouch defining an interior, comprising:

a) a first wall;

b) a second wall opposing and partially sealed to the first wall to form a mouth for access to the interior; and c) a closure mechanism for selectively sealing the mouth, the closure mechanism including:

i) a first zipper having:

an elongated groove profile having two arms which form a general U-shape to define an opening to a channel; and an elongated rib profile opposing the groove profile, wherein a plurality of first segments of the rib profile alternate with a plurality of second segments of the rib profile to create structural discontinuities along a length thereof such that interlocking the groove and rib profiles creates an audible clicking sound along the entire length of at least 50 dB on average during closing, and wherein the second segments have a smaller cross-section when viewed perpendicular to the length of the rib profile than the first segments and wherein the second segments are longer than the first segments; and ii) a second zipper inwardly spaced apart from the profiles on the reclosable bag, the second zipper having a second elongated groove profile and a second elongated rib profile, wherein the elongated rib profile defines a stem extending from a base, and a head portion, and wherein at least one of the plurality of second segments includes an inwardly disposed notch between the stem and the head portion.

2. The reclosable pouch of claim 1, wherein interlocking the second elongated groove profile and the second elongated rib profile does not create an appreciable sound.

3. The reclosable pouch of claim 1, wherein a plurality of first segments of the groove profile alternate with a plurality of second segments of the groove profile to create structural discontinuities along a length thereof, and wherein the second segments of the groove profile have a smaller cross-section when viewed perpendicular to a length of the groove profile than the first segments of the groove profile.

4. The reclosable pouch of claim 1, wherein a portion of the stem is substantially unchanged between the first and second segments.

5. The reclosable pouch of claim 1, wherein at least one of the second elongated groove profile and the second elongated rib profile is shaped differently as compared to the elongated groove profile and the elongated rib profile, respectively.

6. The reclosable pouch of claim 5, wherein at least one of the first segments does not include an inwardly disposed notch between the stem and the head portion.

7. The reclosable pouch of claim 1, wherein the elongated groove profile and the second elongated rib profile are affixed to the first wall, and wherein the elongated rib profile and the second elongated groove profile are affixed to the second wall.

8. The reclosable pouch of claim 1, wherein the audible clicking sound is between 54 and 61 dB.

9. A reclosable pouch defining an interior, comprising:

a) a first wall;

b) a second wall opposing and partially sealed to the first wall to form a mouth for access to the interior; and c) a closure mechanism for selectively sealing the mouth, the closure mechanism including:

i) a first zipper having:

an elongated groove profile having two arms which form a general U-shape to define an opening to a channel; and an elongated rib profile opposing the groove profile, wherein a plurality of first segments of the rib profile alternate with a plurality of second segments of the rib profile to create structural discontinuities along a length thereof, and the second segments have a smaller cross-section when viewed perpendicular to the length of the rib profile than the first segments and the second segments are longer than the first segments; and ii) a second zipper inwardly spaced apart from the profiles on the reclosable bag, the second zipper having a second elongated groove profile and a second elongated rib profile, wherein the elongated rib profile defines a stem extending from a base, and a head portion at a distal end of the elongated rib profile opposite the base, and wherein at least one of the second segments includes an inwardly disposed notch defined between the stem and the head portion.

10. The reclosable pouch of claim 9, wherein interlocking the groove and rib profiles creates an audible clicking sound along an entire length thereof.

11. The reclosable pouch of claim 9, wherein interlocking the groove and rib profiles creates an audible clicking sound of at least 50 dB on average during closing.

12. The reclosable pouch of claim 9, wherein interlocking the groove and rib profiles creates an audible clicking sound that is between 54 and 61 dB.

13. The reclosable pouch of claim 9, wherein interlocking the second elongated groove profile and the second elongated rib profile does not create an appreciable sound.

14. The reclosable pouch of claim 9, wherein at least one of the second elongated groove profile and the second elongated rib profile is shaped differently as compared to the elongated groove profile and the elongated rib profile, respectively.

15. The reclosable pouch of claim 9, wherein a portion of the stem is substantially unchanged between the first and second segments.

16. The reclosable pouch of claim 9, wherein a plurality of first segments of the elongated groove profile alternate with a plurality of second segments of the elongated groove profile to create structural discontinuities along a length thereof, and wherein the second segments of the elongated groove profile have a smaller cross-section when viewed perpendicular to a length of the elongated groove profile than the first segments of the elongated groove profile.

17. The reclosable pouch of claim 16, wherein one of the first segments does not include an inwardly disposed notch between the stem and the head portion.

18. The reclosable pouch of claim 9, wherein the elongated groove profile and the second elongated rib profile are affixed to the first wall, and wherein the elongated rib profile and the second elongated groove profile are affixed to the second wall.

19. A reclosable pouch defining an interior, comprising:

a) a first wall;

b) a second wall opposing and partially sealed to the first wall to form a mouth for access to the interior; and c) a closure mechanism for selectively sealing the mouth, the closure mechanism including:

i) a first zipper having:

an elongated groove profile having two arms which form a general U-shape to define an opening to a channel; and an elongated rib profile opposing the groove profile, wherein a plurality of first segments of the rib profile alternate with a plurality of second segments of the rib profile to create structural discontinuities along a length thereof such that interlocking the groove and rib profiles creates an audible clicking sound along the entire length of at least 50 dB on average during closing, wherein the first segments terminate distally in a first head portion and the second segments terminate distally in a second head portion and wherein the second head portion has a smaller cross-section when viewed perpendicular to the length of the rib profile than the first head portion and wherein the second segments are longer than the first segments; and ii) a second zipper inwardly spaced apart from the profiles on the reclosable bag, the second zipper having a second elongated groove profile and a second elongated rib profile, wherein at least one of the second segments includes an inwardly disposed notch at least partially defined by the second head portion.

20. The reclosable pouch of claim 19, wherein the elongated rib profile defines a stem extending from a base, and wherein the stem is positioned between the inwardly disposed notch and the base.

* * * * *